(12) United States Patent
Park et al.

(10) Patent No.: US 10,730,517 B2
(45) Date of Patent: Aug. 4, 2020

(54) DRIVING SYSTEM AND VEHICLE

(71) Applicant: LG Electronics Inc., Seoul (KR)

(72) Inventors: Yongsoo Park, Seoul (KR); Kwangsik Kong, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 15/856,412

(22) Filed: Dec. 28, 2017

(65) Prior Publication Data

US 2019/0084566 A1 Mar. 21, 2019

(30) Foreign Application Priority Data

Sep. 21, 2017 (KR) ........................ 10-2017-0122052

(51) Int. Cl.
| | | |
|---|---|---|
| *B60W 30/165* | (2020.01) | |
| *B60W 50/00* | (2006.01) | |
| *B60W 50/08* | (2020.01) | |
| *G05D 1/02* | (2020.01) | |
| *G08G 1/00* | (2006.01) | |

(Continued)

(52) U.S. Cl.
CPC ........ *B60W 30/165* (2013.01); *B60W 50/085* (2013.01); *G05D 1/0287* (2013.01); *G08G 1/163* (2013.01); *G08G 1/166* (2013.01); *G08G 1/22* (2013.01); *B60W 2554/00* (2020.02); *B60W 2554/804* (2020.02); *B60W 2555/60* (2020.02); *B60W 2556/65* (2020.02); *B60W 2754/10* (2020.02); *B60W 2754/30* (2020.02); *G01S 13/931* (2013.01)

(58) Field of Classification Search
CPC ............. B60W 30/165; B60W 50/085; B60W 2550/10; B60W 2550/22; B60W 2550/302; B60W 2550/408; B60W 2550/306; B60W 2550/308
USPC .......................................................... 701/23
See application file for complete search history.

(56) References Cited

U.S. PATENT DOCUMENTS

| | | | | |
|---|---|---|---|---|
| 2010/0256835 | A1* | 10/2010 | Mudalige | ............... G08G 1/163 701/2 |
| 2012/0109421 | A1* | 5/2012 | Scarola | .................. G08G 1/163 701/2 |

(Continued)

FOREIGN PATENT DOCUMENTS

| | | |
|---|---|---|
| JP | 2009018621 | 1/2009 |
| JP | 2009211265 | 9/2009 |

(Continued)

OTHER PUBLICATIONS

Partial European Search Report in European Appln. No. 18195453.8, dated Feb. 26, 2019, 13 pages.

*Primary Examiner* — Yazan A Soofi
(74) *Attorney, Agent, or Firm* — Fish & Richardson P.C.

(57) ABSTRACT

A driving system for a vehicle includes: a communication device; at least one processor; and a computer-readable medium coupled to the at least one processor having stored thereon instructions which, when executed by the at least one processor, causes the at least one processor to perform operations including: acquiring, through the communication device, driving control data from a first autonomous driving vehicle; determining a driving speed based on the acquired driving control data; and based on the driving speed, generating a control signal configured to track the first autonomous driving vehicle within a predetermined distance.

14 Claims, 16 Drawing Sheets

(51) Int. Cl.
*G08G 1/16* (2006.01)
*G01S 13/931* (2020.01)

(56) References Cited

U.S. PATENT DOCUMENTS

| | | | | |
|---|---|---|---|---|
| 2012/0123659 | A1* | 5/2012 | Sato | B60W 30/16 |
| | | | | 701/96 |
| 2018/0126991 | A1* | 5/2018 | Endo | B60W 10/08 |
| 2018/0194365 | A1* | 7/2018 | Bae | B60W 40/08 |
| 2019/0243371 | A1* | 8/2019 | Nister | B60W 30/09 |

FOREIGN PATENT DOCUMENTS

| | | |
|---|---|---|
| JP | 2012035819 | 2/2012 |
| JP | 2013067302 | 4/2013 |
| JP | 2015175824 | 10/2015 |
| KR | 1020170031917 | 3/2017 |
| KR | 1020170076645 | 7/2017 |

* cited by examiner

DRIVING SYSTEM AND VEHICLE

CROSS-REFERENCE TO RELATED APPLICATION

This application claims the priority benefit of Korean Patent Application No. 10-2017-0122052, filed on Sep. 21, 2017, the disclosure of which is incorporated herein by reference in its entirety.

TECHNICAL FIELD

The present disclosure relates to a driving system and a vehicle.

BACKGROUND

A vehicle is an apparatus configured to move a user in the user's desired direction. A representative example of a vehicle may be an automobile.

Various types of sensors and electronic devices may be provided in the vehicle to enhance user convenience. For example, an Advanced Driver Assistance System (ADAS) is being actively developed for enhancing the user's driving convenience and safety. In addition, autonomous vehicles are being actively developed.

Adaptive cruise control (ACC) is an example of an advanced driver assistance system. The ACC detects and tracks a preceding vehicle, and attempts to maintain a safe distance between the ACC-controlled vehicle and the preceding vehicle.

SUMMARY

In one aspect, a driving system for a vehicle includes: a communication device; at least one processor; and a computer-readable medium coupled to the at least one processor having stored thereon instructions which, when executed by the at least one processor, causes the at least one processor to perform operations including: acquiring, through the communication device, driving control data from a first autonomous driving vehicle; determining a driving speed based on the acquired driving control data; and based on the driving speed, generating a control signal configured to track the first autonomous driving vehicle within a predetermined distance.

Implementations may include one or more of the following features. For example, the operations include: determining that a driving situation of the vehicle satisfies a first condition; and based on the determination that the driving situation of the vehicle satisfies the first condition, providing the control signal to a vehicle driving device of the vehicle.

In some implementations, determining that the driving situation of the vehicle satisfies the first condition includes: based on the driving situation, determining that (i) a steering control data configured to track the first autonomous driving vehicle is within a first reference range, and (ii) a speed control data configured to track the first autonomous driving vehicle is within a second reference range; and based on the determination that (i) the steering control data configured to track the first autonomous driving vehicle is within the first reference range, and (ii) the speed control data configured to track the first autonomous driving vehicle is within the second reference range, determining that the driving situation of the vehicle satisfies the first condition.

In some implementations, the driving system further includes an object detection device including one or more sensors and configured to acquire object information associated with one or more objects located outside the vehicle, and determining that the driving situation of the vehicle satisfies the first condition includes: determining, based on the object information, whether the first autonomous driving vehicle is detectable by the object detection device; and based on a determination that the first autonomous driving vehicle is detectable by the object detection device, determining that the driving situation of the vehicle satisfies the first condition.

In some implementations, determining, based on the object information, whether the first autonomous driving vehicle is detectable by the object detection device includes: determining a distance between the vehicle and the first autonomous driving vehicle; and determining whether the distance between the vehicle and the first autonomous driving vehicle is within a field of view (FOV) of the one or more sensors of the object detection device.

In some implementations, determining that the driving situation of the vehicle satisfies the first condition includes: acquiring, through the communication device, vehicle driving section information corresponding to a location of the vehicle; determining that an upcoming vehicle driving section is a deceleration section; and based on the determination that the upcoming vehicle driving section is a deceleration section, determining that the driving situation of the vehicle satisfies the first condition.

In some implementations, the operations include: acquiring at least one of vehicle state information or driving environment information; and terminating the generation of the control signal based on the at least one of the vehicle state information or the driving environment information.

In some implementations, the vehicle state information includes one or more of: received signal strength information of the communication device; parking state information of the vehicle; or a user input requesting termination of tracking of the first autonomous driving vehicle.

In some implementations, the driving environment information includes one or more of: road situation information; traffic signal lamp information; driving event information; or neighboring vehicle information.

In some implementations, the operations include: based on the termination of the generation of the control signal, generating a second control signal configured to increase a distance between the vehicle and the first autonomous driving vehicle.

In some implementations, the operations include: based on the termination of the generation of the control signal, transmitting, through the communication device, a request to a first vehicle traveling behind the vehicle configured to increase a distance between the vehicle and the first vehicle.

In some implementations, the operations include: acquiring, through the communication device, a plurality of driving control data from a plurality of autonomous driving vehicles; determining one of the plurality of autonomous driving vehicles to be a primary tracking target vehicle; determining one or more of remaining autonomous vehicles to be secondary tracking target vehicles; and determining the driving speed based on the driving control data acquired from the primary tracking target vehicle.

In some implementations, determining the one of the plurality of autonomous driving vehicles to be the primary tracking target vehicle includes: based on the plurality of driving control data, determining a second autonomous driving vehicle preceding the vehicle to be the primary tracking target vehicle, and determining the driving speed based on the acquired driving control data includes:

determining that a distance between the vehicle and the primary tracking target vehicle is greater than or equal to a reference value; and based on the determination that the distance between the vehicle and the primary tracking target vehicle is greater than or equal to the reference value, further determining the driving speed based on the driving control data acquired from the secondary tracking target vehicle.

In some implementations, determining one or more of remaining autonomous vehicles to be the secondary tracking target vehicles includes: based on the plurality of driving control data, determining a third autonomous driving vehicle that is (i) traveling in a driving lane adjacent to a driving lane of the vehicle, or (ii) traveling behind the vehicle, to be the secondary tracking target vehicle.

In some implementations, determining one of the plurality of autonomous driving vehicles to be the primary tracking target vehicle includes: based on the plurality of driving control data, determining a third autonomous driving vehicle that is (i) traveling in a driving lane adjacent to a driving lane of the vehicle, or (ii) traveling behind the vehicle, to be the primary tracking target vehicle, determining one or more of remaining autonomous vehicles to be the secondary tracking target vehicles includes: based on the plurality of driving control data, determining a second autonomous driving vehicle preceding the vehicle to be the secondary tracking target vehicle, and determining the driving speed based on the acquired driving control data includes: acquiring, through the communication device, driving event information corresponding to an approaching driving section; and based on the acquired driving event information, determining the driving speed based on the driving control data acquired from the secondary tracking target vehicle.

In some implementations, determining one of the plurality of autonomous driving vehicles to be the primary tracking target vehicle includes: based on the plurality of driving control data, determining a second autonomous driving vehicle traveling behind the vehicle to be the primary tracking target vehicle, determining one or more of remaining autonomous vehicles to be the secondary tracking target vehicles includes: based on the plurality of driving control data, determining a third autonomous driving vehicle preceding the vehicle, to be the secondary tracking target vehicle, and the operations include: acquiring, through the communication device, deceleration state information of the primary tracking target vehicle; and based on the acquired deceleration state information, determining the driving speed based on driving control data acquired from the secondary tracking target vehicle.

In some implementations, the operations include: determining that a first distance between the vehicle and the primary tracking target vehicle is greater than a second distance between the vehicle and one of the secondary tracking target vehicles; and based on the determination that the first distance between the vehicle and the primary tracking target vehicle is greater than the second distance between the vehicle and the one of the secondary tracking target vehicles, determining the driving speed based on the driving control data acquired from the one of the secondary tracking target vehicles.

In some implementations, the operations include: determining a first transmission location from which the first autonomous driving vehicle transmitted first driving control data; based on the first driving control data, generating a first control signal configured to track the first autonomous driving vehicle; determining that the vehicle is located at the first transmission location; and based on the determination that the vehicle is located at the first transmission location, providing the first control signal to a vehicle driving device of the vehicle.

In some implementations, the operations include: determining the first autonomous driving vehicle to be a tracking target vehicle among a plurality of autonomous driving vehicles based on at least one of: determination that at least a portion of a first driving route of the first autonomous driving vehicle matches at least a portion of a driving route of the vehicle; determination that the first autonomous driving vehicle is in autonomous driving mode; determination that a passenger is present in the first autonomous driving vehicle, or vehicle power source specification information.

In some implementations, the operations include: based on the generation of the control signal configured to track the first autonomous driving vehicle within the predetermined distance, performing one of: maintaining a driving mode of the vehicle in an autonomous driving mode; or switching a driving mode of the vehicle to an autonomous driving mode; determining that the driving mode of the vehicle is switched to a manual driving mode; and based on the determination that the driving mode of the vehicle is switched from the autonomous driving mode to a manual driving mode, terminating the generation of the control signal.

In some implementations, the acquiring the driving control data from the first autonomous driving vehicle includes: determining that the vehicle has entered a designated autonomous driving vehicle lane while the vehicle is in a manual driving mode; and based on the determination that the vehicle has entered a designated autonomous driving vehicle lane while the vehicle is in the manual driving mode, acquiring, through the communication device, the driving control data from the first autonomous driving vehicle.

In another aspect, a vehicle includes: a plurality of wheels; a power source configured to drive at least one of the plurality of wheels; and the driving system.

In some scenarios, according to some implementations of the present disclosure, one or more of the following effects may be achieved.

First, traffic congestion may be reduced by following an autonomous driving vehicle with a reduced following distance.

Second, a manual driving vehicle may be driven in a semi-autonomous manner by driving based on driving control data of an autonomous driving vehicle.

Effects of the present invention should not be limited to the aforementioned effects and other unmentioned effects will be clearly understood by those skilled in the art from the claims. The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Adaptive cruise control (ACC) detects and tracks a preceding vehicle, and attempts to maintain a safe following distance between the ACC-controlled vehicle and the preceding vehicle. In some situations, however, operation of a conventional ACC may try to maintain a large following distance or induce a fluctuation in speed of the ACC-controlled vehicle, which may contribute to traffic congestion.

An ACC system that receives driving control data received from an autonomous driving vehicle and tracks the autonomous driving vehicle based on the received driving control data is disclosed herein. Such ACC system may provide reduced following distance and may help reduce traffic congestion.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

In the following description, the left side of a vehicle refers to the left side of a traveling direction of the vehicle and the right side of the vehicle refers to the right side of the traveling direction of the vehicle.

Figure 1:
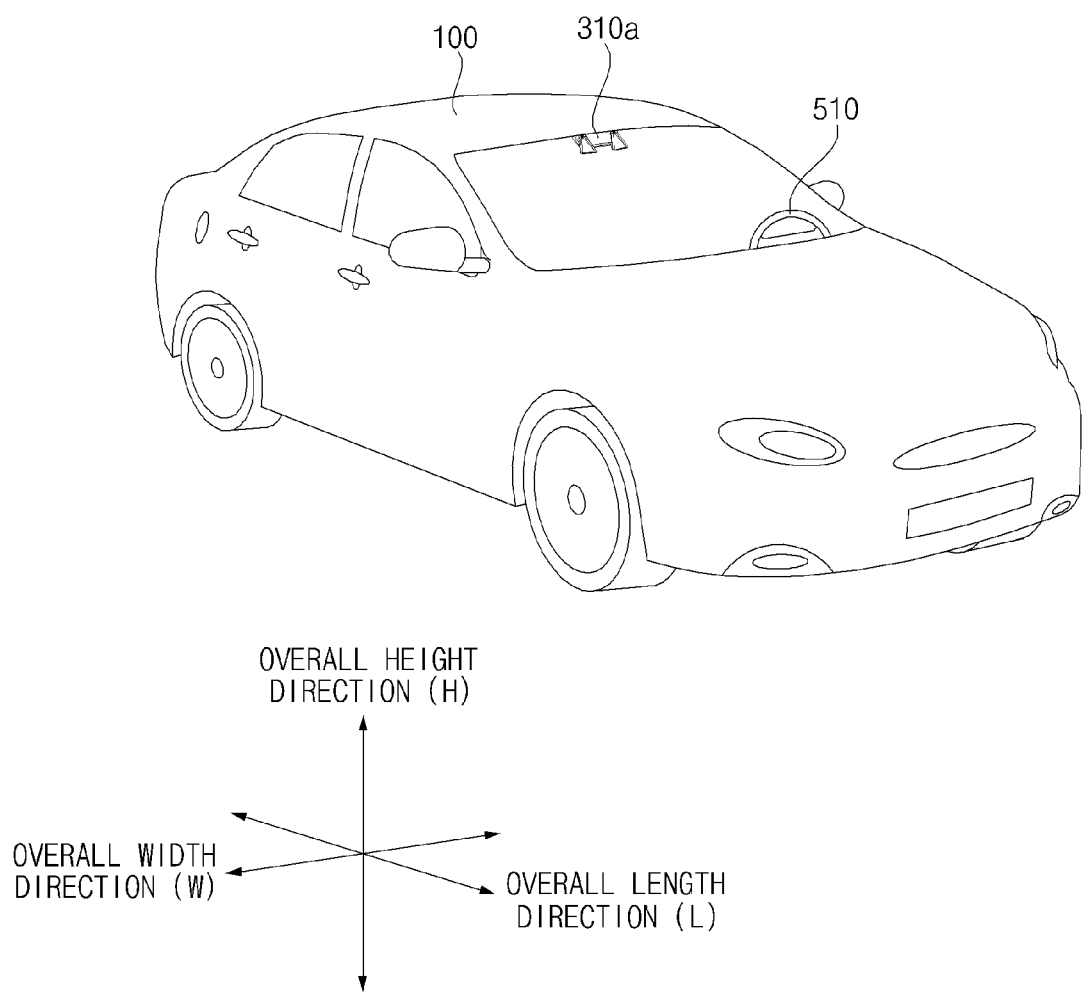
FIG. 1 is a diagram illustrating an example of an exterior of a vehicle.
Figure 2:
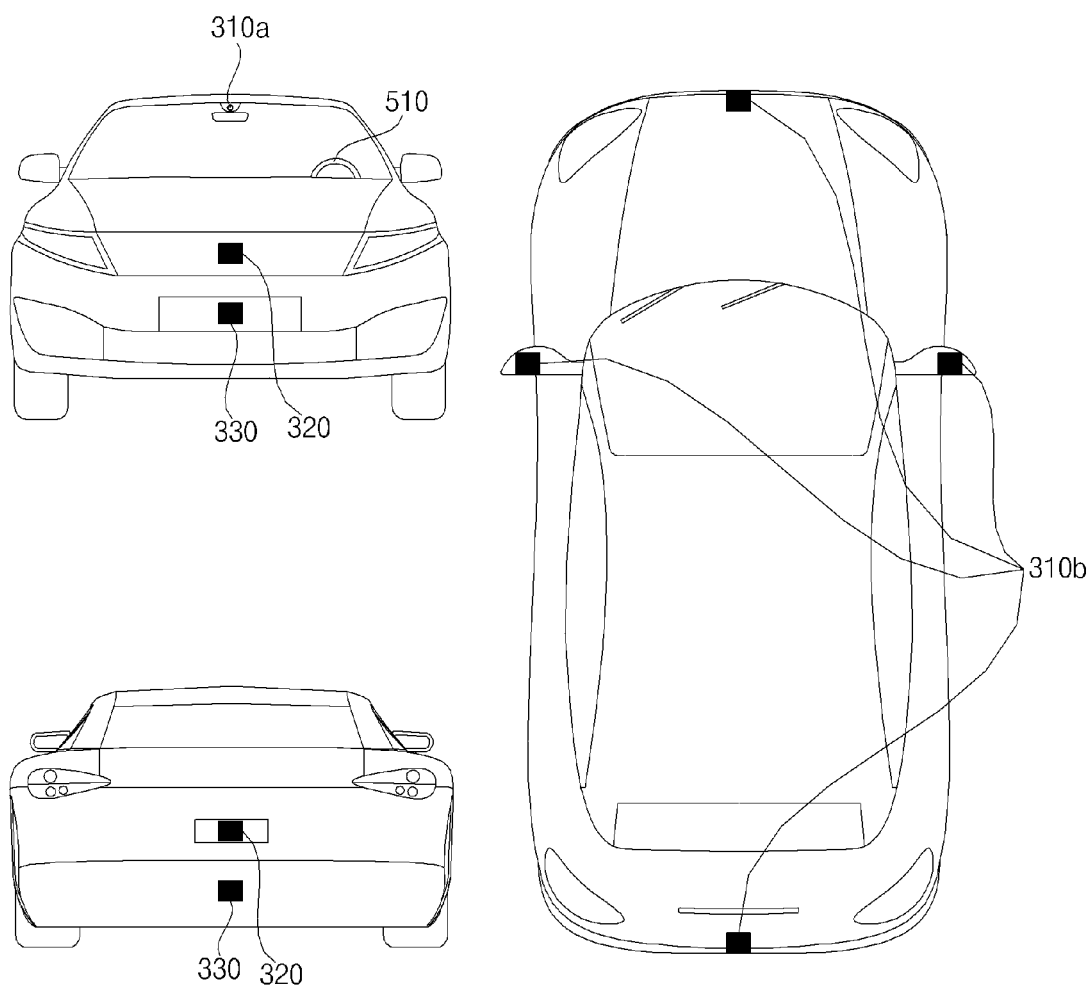
FIG. 2 is a diagram illustrating an example of a vehicle at various angles.
Figure 3:
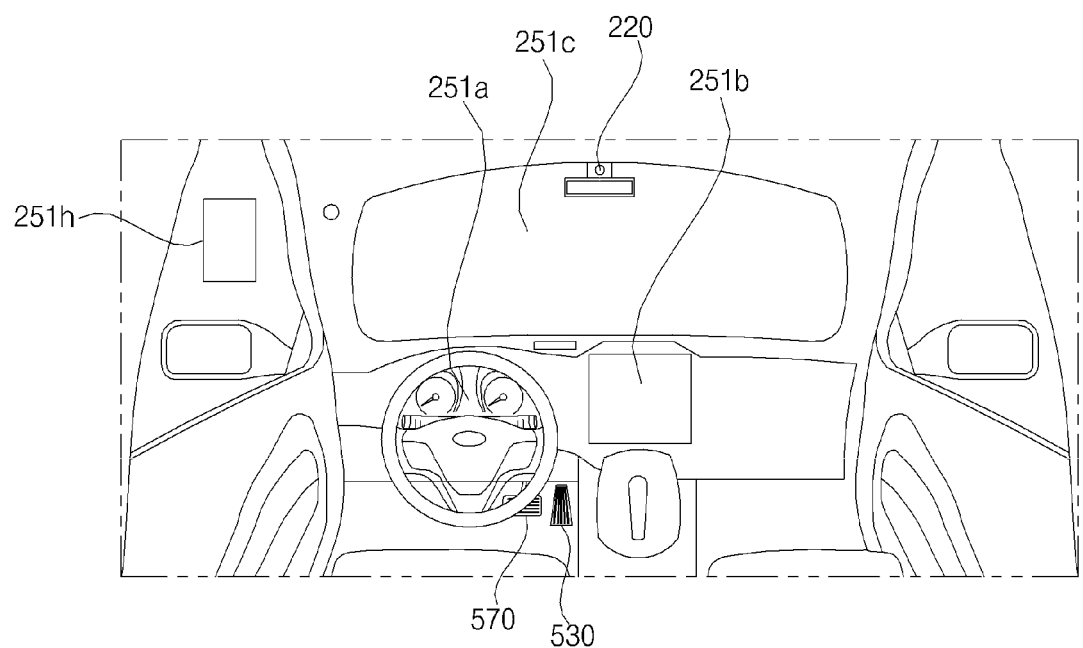
FIGS. 3 and 4 are views illustrating an interior portion of an example of a vehicle.
Figure 4:
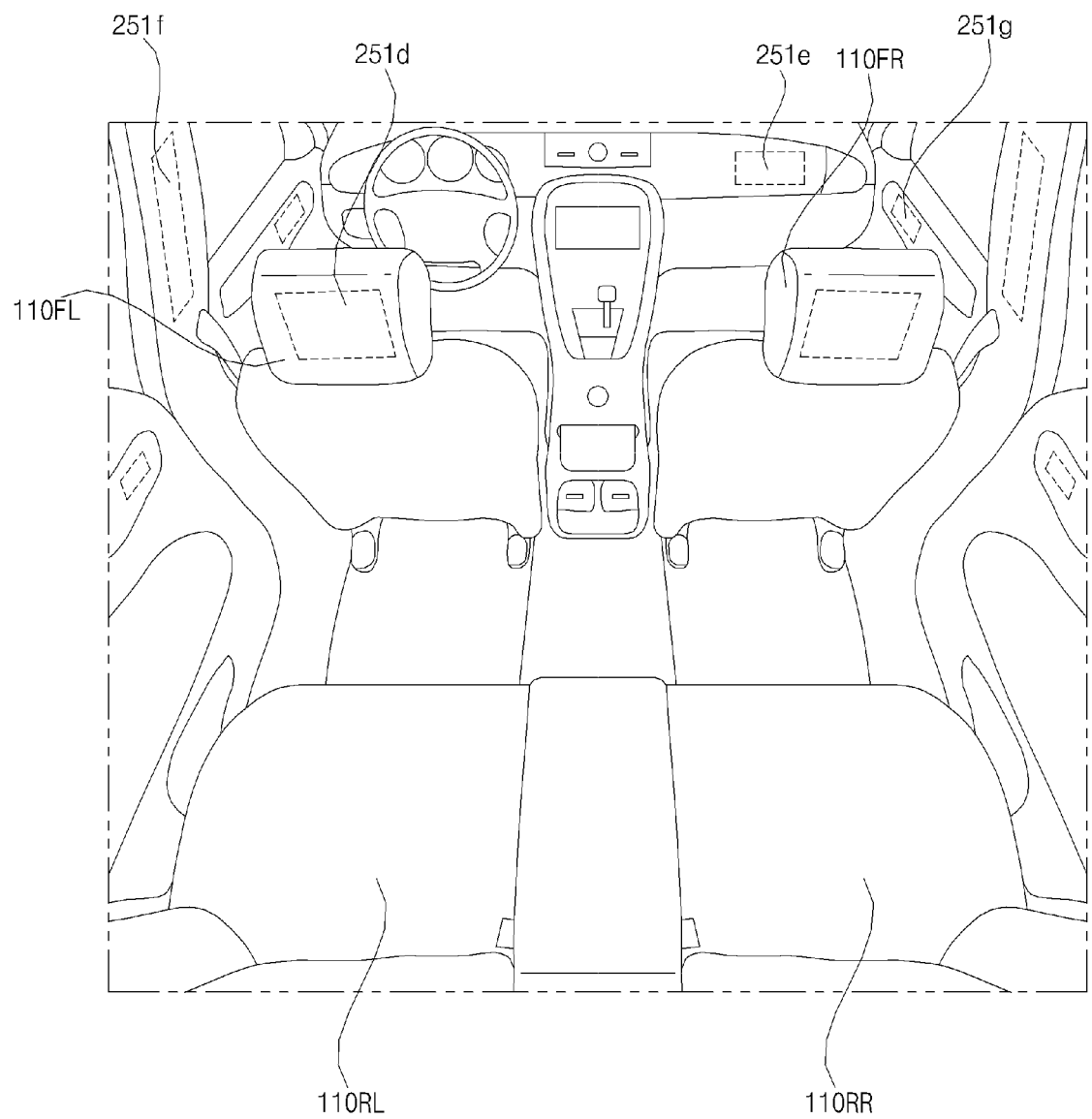
Figure 5:
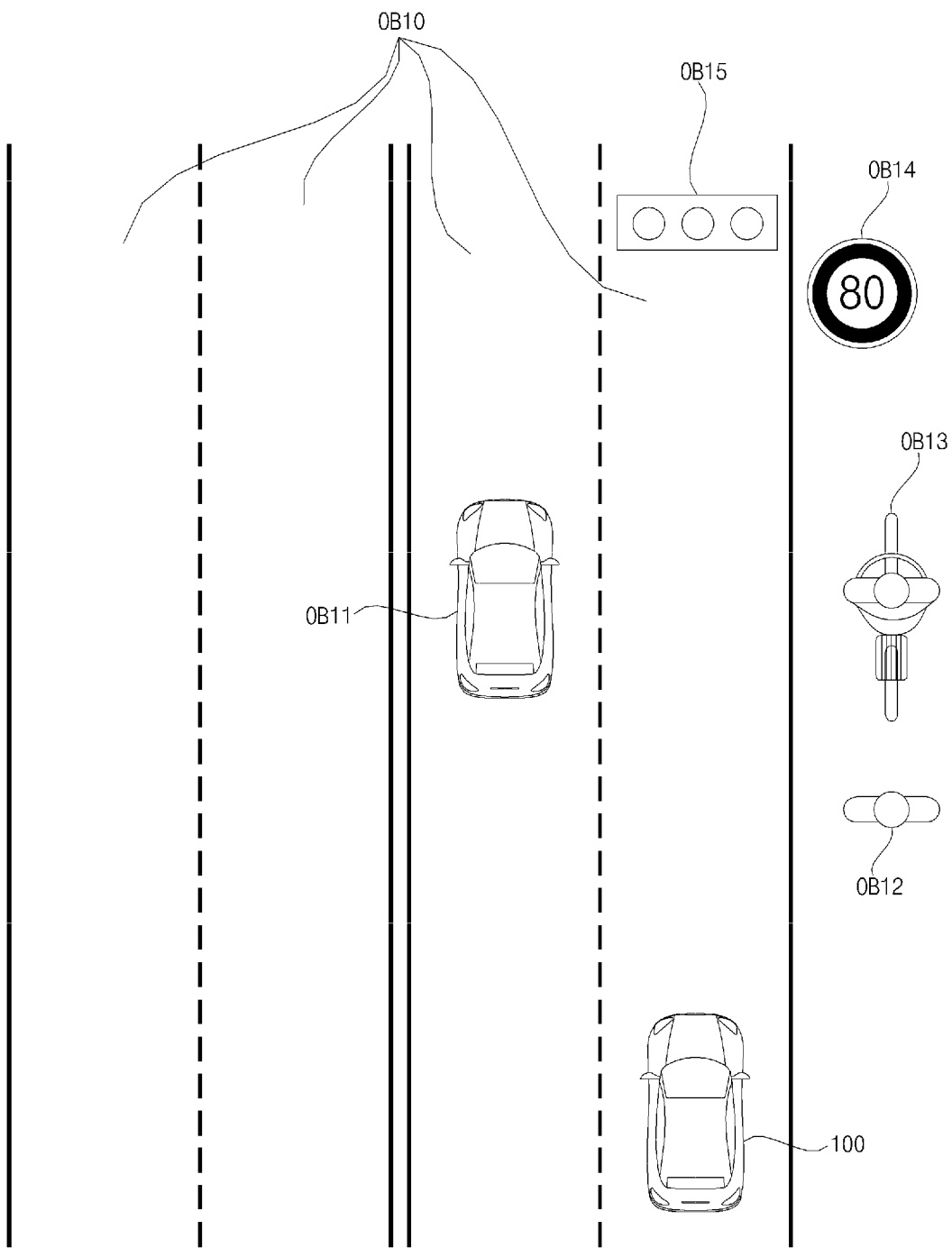
FIGS. 5 and 6 are reference views illustrating examples of objects that are relevant to driving.
Figure 6:
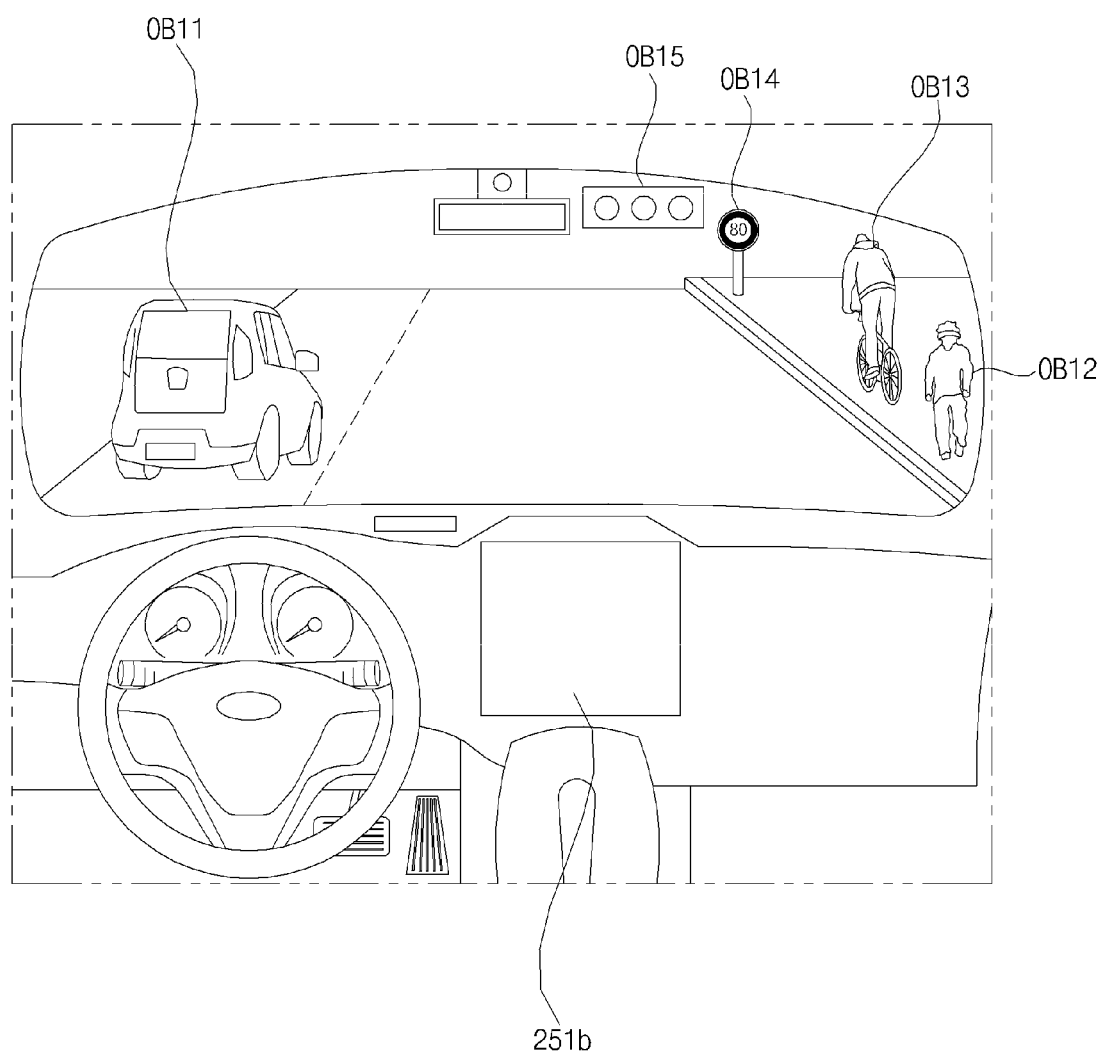
Figure 7:
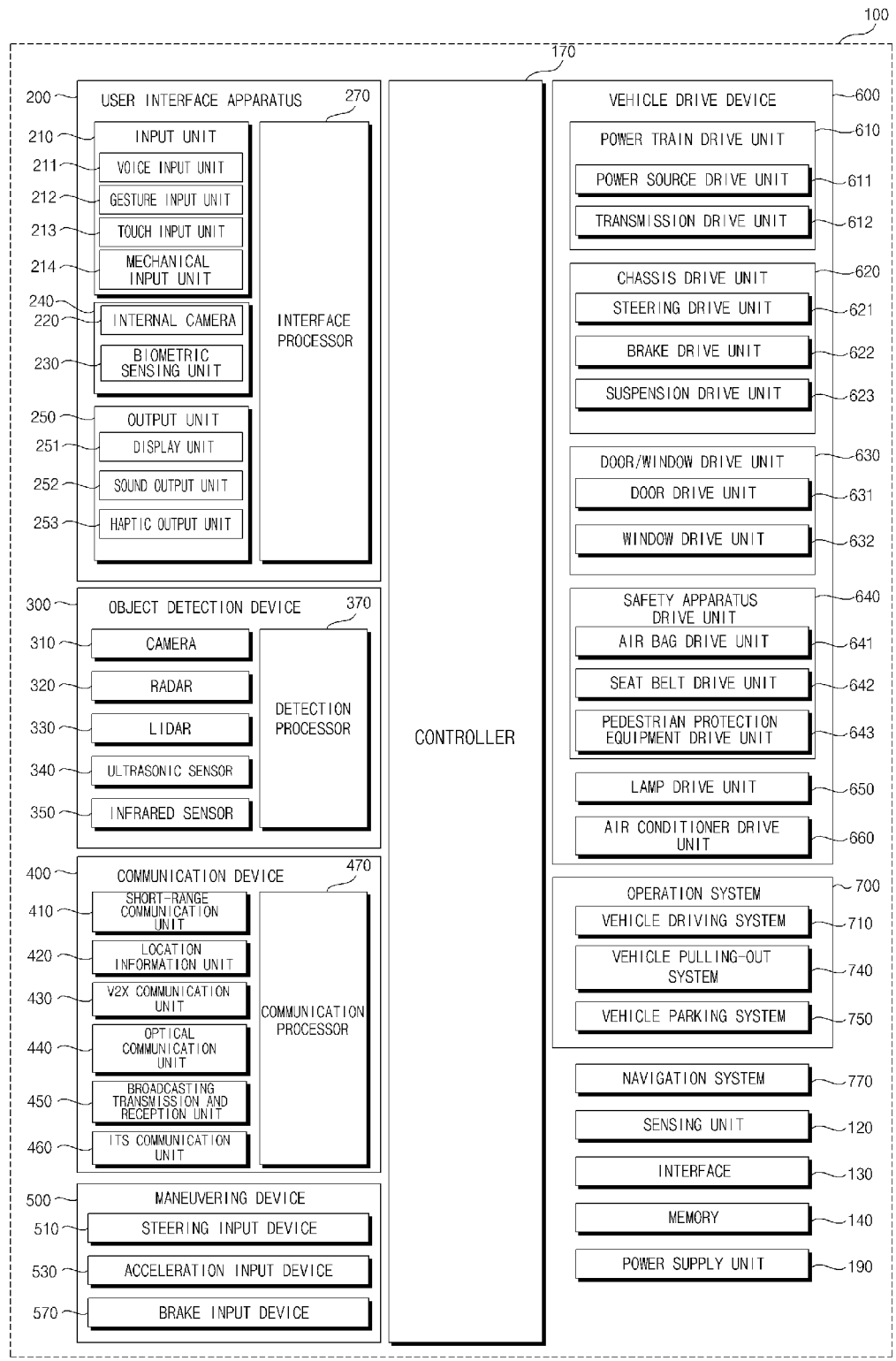
FIG. 7 is a block diagram illustrating subsystems of an example of a vehicle.

FIG. 1 illustrates an example of an exterior of a vehicle.
FIG. 2 illustrates an example of a vehicle at various angles.
FIGS. 3 and 4 illustrate an interior portion of an example of a vehicle. FIGS. 5 and 6 illustrate examples of objects that are relevant to driving. FIG. 7 illustrates subsystems of an example of a vehicle.

Referring to FIGS. 1 to 7, a vehicle 100 may include wheels rotated by a power source, and a steering input device 510 for controlling a travel direction of the vehicle 100.

The vehicle 100 may be an autonomous vehicle.

The vehicle 100 may switch to an autonomous driving mode or a manual mode according to a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on driving situation information.

The driving situation information may include at least one of information about objects outside the vehicle, navigation information, or vehicle state information.

For example, the vehicle 100 may switch from the manual mode to the autonomous driving mode or from the autonomous driving mode to the manual mode, based on driving situation information generated from an object detection device 300.

For example, the vehicle 100 may switch from the manual mode to the autonomous driving mode or from the autonomous driving mode to the manual mode, based on driving situation information generated from a communication device 400.

The vehicle 100 may switch from the manual mode to the autonomous driving mode or from the autonomous driving mode to the manual mode, based on information, data, or a signal provided from an external device.

If the vehicle 100 travels in the autonomous driving mode, the autonomous vehicle 100 may be operated based on an operation system 700.

For example, the autonomous vehicle 100 may travel based on information, data, or signals generated from a driving system 710, a park-out system 740, and a park-in system.

If the vehicle 100 drives in the manual mode, the autonomous vehicle 100 may receive a user input for driving through a driving manipulation device 500. The vehicle 100 may travel based on the user input received through the driving manipulation device 500.

The overall length refers to the length of the vehicle 100 from the front to back of the vehicle 100, the width refers to the width of the vehicle 100, and the height refers to the distance from the bottom of wheels to the roof of the vehicle. In the description below, the overall-length direction L may indicate a direction in which measurement of overall length of the vehicle 100 is performed, the width direction W may indicate a direction in which measurement of width of the vehicle 100 is performed, and the height direction H may indicate a direction in which measurement of height of the vehicle 100 is performed.

As illustrated in FIG. 7, the vehicle 100 may include the UI device 200, the object detection device 300, the communication device 400, the driving manipulation device 500, a vehicle driving device 600, the operation system 700, a navigation system 770, a sensing unit 120, an interface unit 130, a memory 140, a controller 170, and a power supply 190.

In some implementations, the vehicle 100 may further include additional components in addition to the components described in the present disclosure, or may omit one or more of the described components.

The UI device 200 is used to enable the vehicle 100 to communicate with a user. The UI device 200 may receive a user input, and provide information generated from the vehicle 100 to the user. The vehicle 100 may implement UIs or User Experience (UX) through the UI device 200.

The UI device 200 may include an input unit 210, an internal camera 220, a biometric sensing unit 230, an output unit 250, and a processor 270.

In some implementations, the UI device 200 may further include a new component in addition to components described below, or may not include a part of the described components.

The input unit 210 is provided to receive information from a user. Data collected by the input unit 210 may be analyzed by the processor 270 and processed as a control command from the user.

The input unit 210 may be disposed inside the vehicle 100. For example, the input unit 210 may be disposed in an area of a steering wheel, an area of an instrument panel, an area of a seat, an area of a pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an infrared (IR) sensor or an image sensor, for sensing a gesture input of the user.

In some implementations, the gesture input unit 212 may sense a three-dimensional (3D) gesture input of the user. For this purpose, the gesture input unit 212 may include a light output unit for emitting a plurality of IR rays or a plurality of image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some implementations, a touch screen may be configured by integrating the touch input unit 213 with a display unit 251. The touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170. The mechanical input unit 214 may be disposed on the steering wheel, the center fascia, the center console, the cockpit module, a door, or the like.

The internal camera 220 may acquire a vehicle interior image. The processor 270 may sense a state of a user based on the vehicle interior image. The processor 270 may acquire information about the gaze of a user in the vehicle interior image. The processor 270 may sense the user's gesture in the vehicle interior image.

The biometric sensing unit 230 may acquire biometric information about a user. The biometric sensing unit 230 may include a sensor for acquiring biometric information about a user, and acquire information about a fingerprint, heart beats, and so on of a user, using the sensor. The biometric information may be used for user authentication.

The output unit 250 is provided to generate a visual output, an acoustic output, or a haptic output.

The output unit 250 may include at least one of the display unit 251, an audio output unit 252, or a haptic output unit 253.

The display unit 251 may display graphic objects corresponding to various kinds of information.

The display unit 251 may include at least one of a liquid crystal display (LCD), a thin film transistor-liquid crystal display (TFT LCD), an organic light-emitting diode (OLED) display, a flexible display, a 3D display, or an e-ink display.

The display unit 251 may form a layered structure together with the touch input unit 213 or be integrated with the touch input unit 213, thereby implementing a touchscreen.

The display unit 251 may be implemented as a head up display (HUD). In this case, the display unit 251 may be provided with a projection module, and output information by an image projected onto the windshield or a window.

The display unit 251 may include a transparent display. The transparent display may be attached to the windshield or a window.

The transparent display may display a specific screen with a specific transparency. To have a transparency, the transparent display may include at least one of a transparent Thin Film Electroluminescent (TFEL) display, a transparent OLED display, a transparent LCD, a transmissive transparent display, or a transparent LED display. The transparency of the transparent display is adjustable.

The UI device 200 may include a plurality of display units 251a to 251g.

The display unit 251 may be disposed in an area of the steering wheel, areas 251a, 251b, and 251e of the instrument panel, an area 251d of a seat, an area 251f of a pillar, an area 251g of a door, an area of the center console, an area of a head lining, or an area of a sun visor, or may be implemented in an area 251c of the windshield, and an area 251h of a window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a seat belt, a seat 110FL, 110FR, 110RL, or 110RR, so that a user may perceive the output.

The processor 270 may control an operation of each unit of the UI device 200.

In some implementations, the UI device 200 may include a plurality of processors 270 or no processor 270.

If the UI device 200 does not include any processor 270, the UI device 200 may operate under control of a processor of another device in the vehicle 100, or under control of the controller 170.

The UI device 200 may be referred to as a vehicle display device.

The UI device 200 may operate under control of the controller 170.

The object detection device 300 is used to detect an object outside the vehicle 100. The object detection device 300 may generate object information based on sensing data.

The object information may include information indicating presence or absence of an object, information about the location of an object, information indicating the distance between the vehicle 100 and the object, and information about a relative speed of the vehicle 100 with respect to the object.

The object may be any of various objects related to driving of the vehicle 100.

Referring to FIGS. 5 and 6, the object O may include a lane OB10, another vehicle OB11, a pedestrian OB12, a two-wheeled vehicle OB13, a traffic signal OB14 and OB15, light, a road, a structure, a speed bump, a geographical feature, and an animal.

The lane OB10 may include a driving lane, a lane next to the driving lane, and a lane in which a vehicle is driving in the opposite direction. The lane OB10 may include, for example, left and right lines that define each of the lanes. The lane may include, for example, an intersection.

The other vehicle OB11 may be a vehicle driving in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The two-wheel vehicle OB13 may refer to a transportation means moving on two wheels, located around the vehicle 100. The two-wheel vehicle OB13 may be a transportation means having two wheels, located within a predetermined distance from the vehicle 100. For example, the 2-wheel vehicle OB13 may be a motorcycle or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curve, and a slope such as an uphill or downhill road.

The structure may be an object fixed on the ground, near to a road. For example, the structure may be any of a street lamp, a street tree, a building, a utility pole, a signal lamp, a bridge, a curb, and a wall.

The geographical feature may include a mountain, a hill, and so on.

Objects may be classified into mobile objects and stationary objects. For example, the mobile objects may include, for example, another vehicle and a pedestrian. For example, the stationary objects may include, for example, a traffic signal, a road, a structure, another stationary vehicle, and a stationary pedestrian.

The object detection device 300 may include a camera 310, a Radio Detection and Ranging (RADAR) 320, a Light Detection and Ranging (LiDAR) 330, an ultrasonic sensor 340, an IR sensor 350, and a processor 370.

In some implementations, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information about the location of an object, information about a distance to the object, or information about a relative speed with respect to the object by any of various image processing algorithms.

For example, the camera 310 may acquire information about a distance to an object and information about a relative speed with respect to the object in an acquired image, based on a variation in the size of the object over time.

For example, the camera 310 may acquire information about a distance to an object and information about a relative speed with respect to the object through a pin hole model, road surface profiling, or the like.

For example, the camera 310 may acquire information about a distance to an object and information about a relative speed with respect to the object based on disparity information in a stereo image acquired by the stereo camera 310a.

For example, to acquire an image of the front view of the vehicle 100, the camera 310 may be disposed in the vicinity of a front windshield inside the vehicle 100. Alternatively, the camera 310 may be disposed around a front bumper or a radiator grille.

For example, to acquire an image of what lies behind the vehicle 100, the camera 310 may be disposed in the vicinity of a rear glass inside the vehicle 100. Or the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side view mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100 in order to sense an object ahead of, behind, or on a side of the vehicle 100.

The LiDAR 330 may include a laser transmitter and a laser receiver. The LiDAR 330 may be implemented in TOF or phase shifting.

The LiDAR 330 may be implemented in a driven or non-driven manner.

If the LiDAR 330 is implemented in the driven manner, the LiDAR 330 may be rotated by a motor and detect an object around the vehicle 100.

If the LiDAR 330 is implemented in a non-driven manner, the LiDAR 330 may detect an object within a predetermined range from the vehicle 100 by optical steering. The vehicle 100 may include a plurality of non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or on a side of the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100 in order to sense an object ahead of, behind, or on a side of the vehicle 100.

The IR sensor 350 may include an IR transmitter and an IR receiver. The IR sensor 350 may detect an object by IR light, and determine the location, distance, and relative speed of the detected object.

The IR sensor 350 may be disposed at an appropriate position on the exterior of the vehicle 100 in order to sense an object ahead of, behind, or on a side of the vehicle 100. The processor 370 may control an overall operation of each unit of the object detection device 300.

The processor 370 may detect or classify an object by comparing data sensed by the camera 310, the RADAR 320, the LiDAR 330, the ultrasonic sensor 340, and the IR sensor 350 with pre-stored data.

The processor 370 may detect an object and track the detected object, based on an acquired image. The processor 370 may calculate a distance to the object, a relative speed with respect to the object, and so on by an image processing algorithm.

For example, the processor 370 may acquire information about a distance to an object and information about a relative speed with respect to the object from an acquired image, based on a variation in the size of the object over time.

For example, the processor 370 may acquire information about a distance to an object and information about a relative speed with respect to the object from an image acquired from the stereo camera 310a.

For example, the processor 370 may acquire information about a distance to an object and information about a relative speed with respect to the object from an image acquired from the stereo camera 310a, based on disparity information. The processor 370 may detect an object and track the detected object based on electromagnetic waves which are transmitted, are reflected from an object, and then return. The processor 370 may calculate a distance to the object and a relative speed with respect to the object, based on the electromagnetic waves.

The processor 370 may detect an object and track the detected object based on laser light which is transmitted, is reflected from an object, and then returns. The sensing processor 370 may calculate a distance to the object and a relative speed with respect to the object, based on the laser light.

The processor 370 may detect an object and track the detected object based on ultrasonic waves which are transmitted, are reflected from an object, and then return. The processor 370 may calculate a distance to the object and a relative speed with respect to the object, based on the ultrasonic waves.

The processor 370 may detect an object and track the detected object based on IR light which is transmitted, is reflected from an object, and then returns. The processor 370 may calculate a distance to the object and a relative speed with respect to the object, based on the IR light.

In some implementations, the object detection device 300 may include a plurality of processors 370 or no processor 370. For example, the camera 310, the RADAR 320, the LiDAR 330, the ultrasonic sensor 340, and the IR sensor 350 may include individual processors.

If the object detection device 300 includes no processor 370, the object detection device 300 may operate under control of a processor of a device in the vehicle 100 or under control of the controller 170.

The object detection device 300 may operate under control of the controller 170.

The communication device 400 is used to communicate with an external device. The external device may be another vehicle, a mobile terminal, or a server.

The communication device 400 may include at least one of a transmit antenna and a receive antenna, for communication, or a Radio Frequency (RF) circuit and device, for implementing various communication protocols.

The communication device 400 may include a short-range communication unit 410, a location information unit 420, a vehicle-to-everything (V2X) communication unit 430, an optical communication unit 440, a broadcasting transceiver unit 450, an intelligent transport system (ITS) communication unit 460, and a processor 470.

In some implementations, the communication device 400 may further include a new component in addition to components described below, or may not include a part of the described components.

The short-range communication module 410 is a unit for conducting short-range communication. The short-range communication module 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information about a location of the vehicle 100. The location information unit 420 may include at least one of a global positioning system (GPS) module or a Differential Global Positioning System (DGPS) module.

The V2X communication unit 430 is a unit used for wireless communication with a server (by vehicle-to-infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information and data to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may control an overall operation of each unit of the communication device 400.

In some implementations, the communication device 400 may include a plurality of processors 470 or no processor 470.

If the communication device 400 does not include any processor 470, the communication device 400 may operate under control of a processor of another device in the vehicle 100 or under control of the controller 170.

The communication device 400 may be configured along with the UI device 200, as a vehicle multimedia device. In this case, the vehicle multimedia device may be referred to as a telematics device or an Audio Video Navigation (AVN) device.

The communication device 400 may operate under control of the controller 170.

The driving manipulation device 500 is used to receive a user command for driving the vehicle 100.

In the manual mode, the vehicle 100 may travel based on a signal provided by the driving manipulation device 500.

The driving manipulation device 500 may include the steering input device 510, an acceleration input device 530, and a brake input device 570.

The steering input device 510 may receive a travel direction input for the vehicle 100 from a user. The steering input device 510 may take the form of a wheel to rotate to provide a steering input. In some implementations, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 are preferably formed into pedals. In some implementations, the acceleration input device 530 or the brake input device 570 may be configured as a touch screen, a touchpad, or a button.

The driving manipulation device 500 may operate under control of the controller 170.

The vehicle driving device 600 is used to electrically control operations of various devices of the vehicle 100.

The vehicle driving device 600 may include at least one of a power train driving unit 610, a chassis driving unit 620, a door/window driving unit 630, a safety device driving unit 640, a lamp driving unit 650, or an air conditioner driving unit 660.

In some implementations, the vehicle driving device 600 may further include a new component in addition to components described below or may not include a part of the components.

The vehicle driving device 600 may include a processor. Each unit of the vehicle driving device 600 may include a processor.

The power train driving unit 610 may control operation of a power train device.

The power train driving unit 610 may include a power source driver 611 and a transmission driver 612.

The power source driver 611 may control a power source of the vehicle 100.

For example, if the power source is a fossil fuel-based engine, the power source driver 611 may perform electronic control on the engine. Therefore, the power source driver 611 may control an output torque of the engine, and the like. The power source driver 611 may adjust the engine output torque under control of the controller 170.

For example, if the power source is an electrical energy-based motor, the power source driver 611 may control the motor. The power source driver 611 may adjust a rotation speed, torque, and so on of the motor under control of the controller 170.

The transmission driver 612 may control a transmission. The transmission driver 612 may adjust a state of the transmission. The transmission driver 612 may adjust the state of the transmission to drive D, reverse R, neutral N, or park P.

If the power source is the engine, the transmission driver 612 may adjust the engagement state of gears in the drive mode D.

The chassis driving unit 620 may control operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a travel direction of the vehicle 100.

The brake driver 622 may perform electronic control on a brake device in the vehicle 100. For example, the brake driver 622 may decrease the speed of the vehicle 100 by controlling an operation of a brake disposed at a wheel.

The brake driver 622 may control a plurality of brakes individually. The brake driver 622 may control braking power applied to a plurality of wheels differently.

The suspension driver 623 may perform electronic control on a suspension device in the vehicle 100. For example, if the surface of a road is rugged, the suspension driver 623 may control the suspension device to reduce jerk of the vehicle 100.

The suspension driver 623 may control a plurality of suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device in the vehicle 100. For example, the door driver 631 may control opening and closing of a plurality of doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of a plurality of windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control securing of passengers on the seats 110FL, 110FR, 110RL, and 110RR by means of seatbelts, upon sensing a danger.

The pedestrian protection device driver 643 may perform electronic control on a hood lift and a pedestrian airbag. For example, the pedestrian protection device driver 643 may control the hood to be lifted up and the pedestrian airbag to be inflated, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, if a vehicle internal temperature is high, the air conditioner driver 660 may control the air conditioner to operate and supply cool air into the vehicle 100.

The vehicle driving device 600 may include a processor. Each unit of the vehicle driving device 600 may include a processor.

The vehicle driving device 600 may operate under control of the controller 170.

The operation system 700 is a system that controls various operations of the vehicle 100. The operation system 700 may operate in the autonomous driving mode.

The operation system 700 may include the driving system 710, the park-out system 740, and the park-in system 750.

In some implementations, the operation system 700 may further include a new component in addition to components described below or may not include a part of the described components.

The operation system 700 may include a processor. Each unit of the operation system 700 may include a processor.

In some implementations, if the operation system 700 is implemented in software, the operation system 700 may be implemented by the controller 170.

In some implementations, the operation system 700 may include, for example, at least one of the UI device 200, the object detection device 300, the communication device 400, the driving manipulation device 500, the vehicle driving device 600, the navigation system 770, the sensing unit 120, or the controller 170.

The driving system 710 may drive the vehicle 100.

The driving system 710 may drive the vehicle 100 by providing a control signal to the vehicle driving device 600 based on navigation information received from the navigation system 770.

The driving system 710 may drive the vehicle 100 by providing a control signal to the vehicle driving device 600 based on object information received from the object detection device 300.

The driving system 710 may drive the vehicle 100 by receiving a signal from an external device through the communication device 400 and providing a control signal to the vehicle driving device 600.

In some implementations, the driving system 710 may be a system that includes at least one of the UI device 200, the object detection device 300, the communication device 400, the driving manipulation device 500, the vehicle driving device 600, the navigation system 770, the sensing unit 120, or the controller 170, and drives the vehicle 100.

The driving system 710 may be referred to as a vehicle driving control device.

The park-out system 740 may perform park-out of the vehicle 100.

The park-out system 740 may perform park-out of the vehicle 100 by providing a control signal to the vehicle driving device 600 according to navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

In some implementations, the park-out system 740 may be a system that includes at least one of the UI device 200, the object detection device 300, the communication device 400, the driving manipulation device 500, the vehicle driving device 600, the navigation system 770, the sensing unit 120, or the controller 170 and performs park-out of the vehicle 100.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 according to navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by providing a control signal to the vehicle driving device 600 according to a signal received from an external device via the communication device 400.

In some implementations, the park-in system 750 may be a system that includes at least one of the UI device 200, the object detection device 300, the communication device 400, the driving manipulation device 500, the vehicle driving device 600, the navigation system 770, the sensing unit 120, or the controller 170, and performs park-in of the vehicle 100.

The park-in system 750 may be referred to as a vehicle park-in control device.

The navigation system 770 may provide navigation information. The navigation information may include at least one of map information, set destination information, route information based on setting of a destination, information about various objects on a route, lane information, or information about a current location of a vehicle.

The navigation system 770 may include a memory and a processor. The memory may store navigation information. The processor may control operation of the navigation system 770.

In some implementations, the navigation system 770 may receive information from an external device via the communication device 400 and update pre-stored information with the received information.

In some implementations, the navigation system 770 may be classified as a lower-level component of the UI device 200.

The sensing unit 120 may sense a vehicle state. The sensing unit 120 may include an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, a brake pedal position sensor, and so on.

The inertial navigation unit (IMU) sensor may include one or more of an acceleration sensor, a gyro sensor, and a magnetic sensor.

The sensing unit 120 may acquire a sensing signal of vehicle position information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 120 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The interface unit 130 serves paths to various types of external devices connected to the vehicle 100. For example, the interface unit 130 may be provided with a port connectable to a mobile terminal, and may be connected to a mobile terminal through the port. In this case, the interface unit 130 may exchange data with the mobile terminal.

The interface unit 130 may serve as a path along which electric energy is supplied to a connected mobile terminal. When the mobile terminal is electrically connected to the interface unit 130, the interface unit 130 may supply electric energy received from the power supply 190 to the mobile terminal under control of the controller 170.

The memory 140 is electrically connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for an overall operation of the vehicle 100, such as programs for processing or control in the controller 170.

In some implementations, the memory 140 may be integrated with the controller 170, or configured as a lower level component of the controller 170.

The controller 170 may control an overall operation of each unit in the vehicle 100. The controller 170 may be referred to as an electronic control unit (ECU).

The power supply 190 may supply power required for an operation of each component under control of the controller 170. In particular, the power supply 190 may receive power from a battery, etc. in the vehicle.

One or more processors and the controller 170, included in the vehicle 100, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions.

Figure 8:
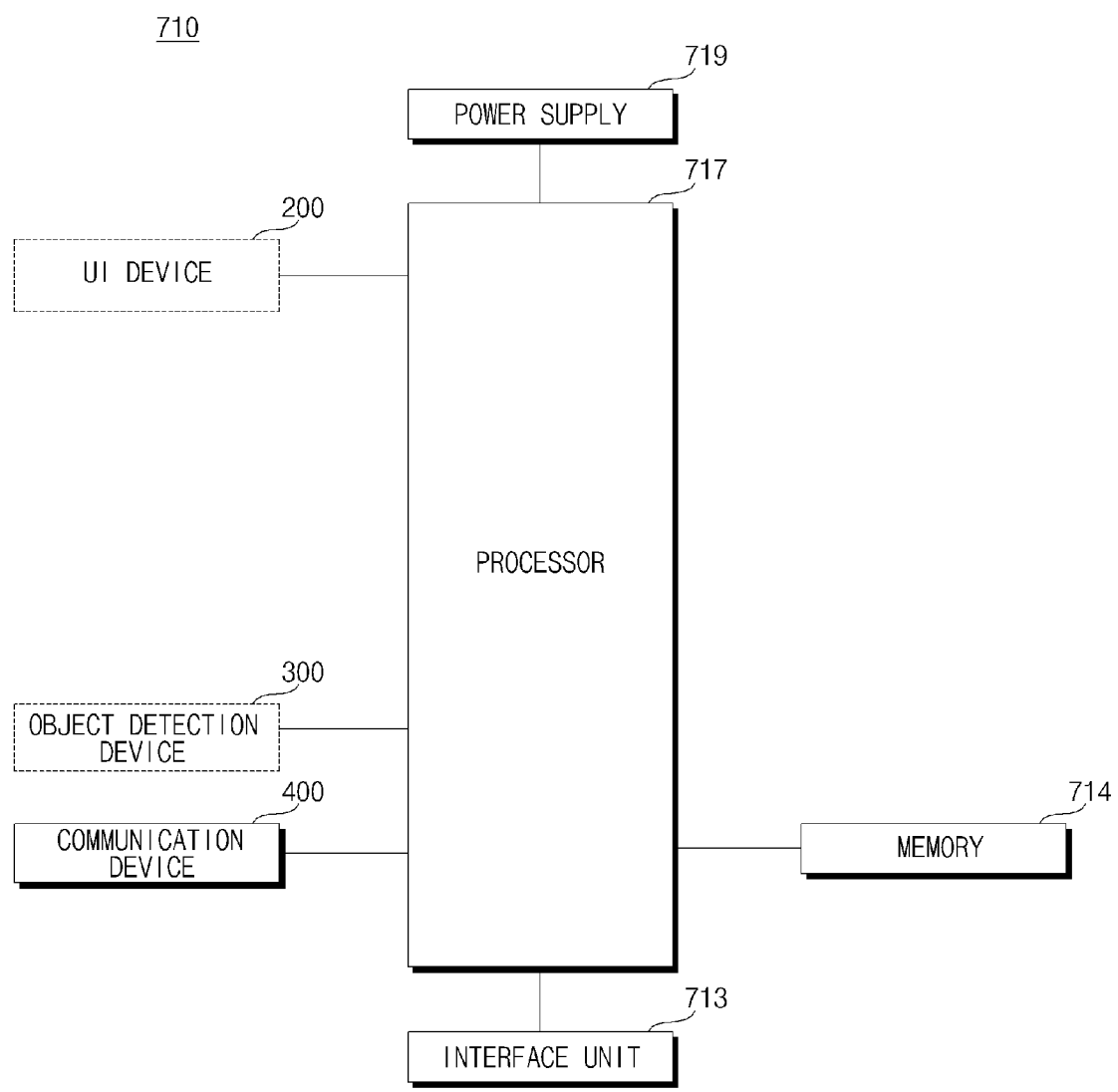
FIG. 8 is a block diagram illustrating a driving system according to an implementation of the present disclosure.

FIG. 8 illustrates a driving system according to an implementation of the present disclosure.

The vehicle 100 may include the driving system 710 and a plurality of wheels driven based on a control signal generated by the driving system 710.

The driving system 710 may be referred to as a driving control device.

Referring to FIG. 8, the driving system 710 may include the communication device 400, an interface unit 713, a memory 714, at least one process such as a processor 717, and a power supply 719.

In some implementations, the driving system 710 may further include the UI device 200 and the object detection device 300, which may be separate components or integrated with the driving system 710.

The description of the UI device 200 given with reference to FIGS. 1 to 7 may be applied to the UI device 200. The UI device 200 may output content based on data, information, or signals generated or processed by the processor 717.

For example, the UI device 200 may output a manual driving conversion request signal. The UI device 200 may receive a user input for manual driving conversion.

The description of the object detection device 300 given with reference to FIGS. 1 to 7 may be applied to the object detection device 300.

The object detection device 300 may include one or more sensors.

The object detection device 300 may generate information on an object outside the vehicle 100.

For example, as described above, the object detection device 300 may include the camera 310, the Radio Detection and Ranging (RADAR) 320, the Light Detection and Ranging (LiDAR) 330, the ultrasonic sensor 340, and the IR sensor 350.

The description of the communication device 400 given with reference to FIGS. 1 to 7 may be applied to the communication device 400.

The communication device 400 may communicate with other devices.

For example, the communication device 400 may communicate with at least one of another vehicle or an external server.

The communication device 400 may receive information, a signal, or data from at least one of another vehicle or an external server.

The communication device 400 may receive driving control data of another autonomous driving vehicle from the other autonomous driving vehicle. In general, the driving control data may include data related to controlling a movement of the vehicle.

The driving control data may include data provided to a vehicle driving device from an ECU.

The driving control data may include data for controlling at least one of a steering device, a brake device, a power source, a transmission device, or a suspension device.

The driving control data may include sensing data of a sensor included in another autonomous driving vehicle.

The driving control data may include at least one of steering sensing data, brake sensing data, power source sensing data, transmission state sensing data, or suspension state sensing data.

The communication device 400 may provide the received information, signal, or data to the processor 717.

In some implementations, the communication device 400 may receive driving control data of each of a plurality of other autonomous driving vehicles from the plurality of other autonomous driving vehicles.

The communication device 400 may transmit information, a signal, or data to at least one of another vehicle or an external server.

The communication device 400 may transmit driving control data of the vehicle 100 to another vehicle.

The driving control data may include data provided to the vehicle driving device 600 from the controller 170.

The driving control data may include sensing data of the sensing unit 120.

The interface unit 713 may exchange information, a signal, or data with other devices included in the vehicle 100. The interface unit 713 may transmit the received information, signal, or data to the processor 717. The interface unit 713 may transmit the information, signal, or data that is generated or processed by the processor 717 to other devices included in the vehicle 100. The interface unit 713 may receive information, a signal, or data from other devices included in the vehicle 100.

The interface unit 713 may receive driving situation information.

The memory 714 may be electrically connected to the processor 717. The memory 714 may store default data of a unit, control data of operation control of a unit, and input and output data. The memory 714 may be any of various storage devices in hardware, such as a Read Only Memory (ROM), a Random Access Memory (RAM), an Erasable and Programmable ROM (EPROM), a flash drive, and a hard drive. The memory 714 may store various data for an overall operation of the autonomous driving system 710, such as programs for processing or control in the processor 717.

In some implementations, the memory 714 may be integrated into the processor 717 or may be implemented as a subcomponent of the processor 717.

The processor 717 may be electrically connected to each unit of the autonomous driving system 710.

The processor 717 may control an overall operation of each unit of the autonomous driving system 710.

The processor 717 may receive information of another vehicle from the other vehicle through the communication device 400.

For example, the processor 717 may receive information on whether the other vehicle is an autonomous driving vehicle from the other vehicle through the communication device 400.

The processor 717 may receive driving control data of another autonomous driving vehicle from the other autonomous driving vehicle through the communication device 400.

The processor 717 may determine driving speed of the vehicle 100 based on driving control data of another autonomous driving vehicle.

The processor 717 may provide a control signal for driving to track another autonomous driving vehicle within a predetermined distance according to the determined driving speed.

The processor 717 may provide the control signal to at least one of the controller 170 or the vehicle driving device 600.

The processor 717 may acquire driving situation information.

The processor 717 may receive driving situation information from the sensing unit 120 through the interface unit 713 or may receive driving situation information from the object detection device 300 or the communication device 400.

The processor 717 may determine whether a driving situation of the vehicle 100 satisfies a first condition based on the driving situation information.

The first condition may be defined, for example, as a condition that is suitable for the vehicle 100 to track another autonomous driving vehicle.

Upon determining that a driving situation satisfies the first condition, the processor 717 may control the vehicle 100 to travel based on the driving control data received from another autonomous driving vehicle.

Upon determining that the driving situation satisfies the first condition, the processor 717 may determine driving speed of the vehicle 100 and may provide a control signal for driving to track another autonomous driving vehicle within a predetermined distance according to the determined driving speed.

For example, upon determining that the steering control is possible within a reference range and speed control is possible within a reference range, the processor 717 may provide a control signal.

For example, a control signal for tracking the autonomous vehicle may include a steering control data and a speed control data to allow the vehicle to track the autonomous vehicle. If the range of steering control or the range of speed control needed to track the autonomous vehicle is within a reference range, the processor 717 may provide a control signal. If the range of steering control or the range of speed control needed to track the autonomous vehicle is outside a reference range, the processor 717 may not provide a control signal The possibility of a vehicular accident may be elevated when tracking another vehicle in a highly curved section, a low-speed driving situation, or a high-speed driving situation. As such, tracking may be suspended or terminated in such situations to avoid elevated risk of accident.

For example, upon determining that another autonomous driving vehicle is capable of being sensed by a sensor of an object detection device within a reference range, the processor 717 may provide a control signal.

Even if another autonomous driving vehicle is tracked based on data received through the communication device 400, the tracking of the other autonomous driving vehicle may be incomplete when the other autonomous driving vehicle is not sensed by a sensor. Tracking of the other autonomous driving vehicle may be performed in a more robust and safe manner by complementing the data received through the communication device 400 with the object information associated with the autonomous driving vehicle being tracked obtained through the sensors.

The processor 717 may acquire vehicle driving section information.

The vehicle driving section information may be included, for example, in vehicle driving situation information.

The processor 717 may provide a control signal based on determination of whether a vehicle driving section corresponds to a deceleration section.

The deceleration section may include a curve section, a slope section, a joining section, an intersection section, and a crosswalk section.

When driving in the deceleration section, if the vehicle 100 tracks another autonomous driving vehicle, possibility of an accident may be increased. As such, tracking may be suspended or terminated in the deceleration section to avoid elevated risk of accident.

The processor 717 may acquire at least one of vehicle state information or driving environment information.

The processor 717 may receive the vehicle state information and the driving environment information from another device in the vehicle 100 through the interface unit 713.

The processor 717 may receive the vehicle state information or the driving environment information from the object detection device 300 or the communication device 400.

The processor 717 may stop providing a control signal based on at least one of the vehicle state information or the driving environment information. As such, the processor 717 may stop driving based on the driving control data from a first another vehicle 1010. As such, the vehicle 100 may terminate tracking of another autonomous driving vehicle. The vehicle state information may include reception sensitivity information of the communication device 400 (e.g., received signal strength information), parking state information and user input reception information of the vehicle 100.

When reception sensitivity of the communication device 400 is equal to or less than a reference value, the processor 717 may stop providing a control signal.

When the signal strength of driving control data received through the communication device is equal to or less than a reference value, the processor 717 may stop providing a control signal.

When the vehicle 100 is being parked, the processor 717 may stop providing a control signal.

Upon receiving user input requesting termination of tracking, the processor 717 may stop providing a control signal. The processor 717 may receive a user input through the UI device 200.

The driving environment information may include road situation information, traffic signal lamp information, driving event information, and nearby vehicle (e.g., nearby vehicles and surrounding vehicles) information.

The road situation information may include intersection section information, joining section information, and branch section information.

When the vehicle 100 is expected to enter or enters any one of an intersection section, a joining section, and a branch section, the processor 717 may stop providing a control signal.

The driving event occurrence information may include accident occurrence information and construction progress information.

When the vehicle 100 is expected to enter or enters the accident occurrence section and the construction progress section, the processor 717 may stop providing a control signal.

When another trackable autonomous driving vehicle is not present around the vehicle 100, the processor 717 may stop providing a control signal. For example, when no autonomous driving vehicle is present around the vehicle 100, the processor 717 may stop providing a control signal.

When stopping providing a control signal, the processor 717 may provide the control signal to increase a distance value between the vehicle 100 and another autonomous driving vehicle.

In a situation where the vehicle 100 approaches and tracks an autonomous driving vehicle and then stops tracking, the vehicle 100 may ensure a safe distance. As such, when stopping providing of a control signal, the processor 717 may transmit a signal to a following vehicle through the communication device 400 to increase a distance value between the vehicle 100 and the following vehicle of the vehicle 100. The processor 717 may receive driving control data of each of a plurality of other another autonomous driving vehicles from the plurality of other autonomous driving vehicles through the communication device 400.

The processor 717 may set any one of the plurality of other autonomous driving vehicles as a main tracking target vehicle.

The processor 717 may set one or more vehicles except for the vehicle set as the main, or primary, tracking target vehicle among the plurality of other autonomous driving vehicles, as a secondary tracking target vehicle.

The processor 717 may determine driving speed based on the driving control data received from the main tracking target vehicle.

For example, the processor 717 may set another autonomous driving vehicle that precedes the vehicle 100 as a main tracking target vehicle.

As another example, the processor 717 may set another autonomous driving vehicle that travels on a next or adjacent lane of a driving lane of the vehicle 100 and another autonomous driving vehicle that follows the vehicle 100 as a secondary tracking target vehicle.

When determining a distance value from a main tracking target vehicle is equal to or greater than a reference value, the processor 717 may determine driving speed based on driving control data received from a secondary tracking target vehicle.

For example, when a signal of a traffic lamp is changed from green to red after a main tracking target vehicle passes through an intersection, the vehicle 100 may no longer be able to track the main tracking target vehicle. As such, a target tracking target vehicle may be changed to the secondary tracking target vehicle.

The processor 717 may set another autonomous driving vehicle driving in a lane next to a driving lane of the vehicle 100 or another autonomous driving vehicle following the vehicle 100 as the main tracking target vehicle.

The processor 717 may set another autonomous driving vehicle that precedes the vehicle 100 as the secondary tracking target vehicle.

Upon acquiring event occurrence information ahead of the vehicle 100, the processor 717 may determine driving speed based on driving control data received from the secondary tracking target vehicle.

The event occurrence information may include information that are related to vehicle driving, such as accident occurrence information and construction progress information. Based on such control, collision risks may be reduced by anticipating such events.

The processor 717 may set another autonomous driving vehicle that follows the vehicle 100 as the main tracking target vehicle.

The processor 717 may set another autonomous driving vehicle that precedes the vehicle 100 as the secondary tracking target vehicle.

Upon receiving deceleration state information of the main tracking target vehicle, the processor 717 may determine driving speed based on driving control data received from the secondary tracking target vehicle.

In some situations, the vehicle 100 may travel along with the main tracking target vehicle and the secondary tracking target vehicle.

In this case, upon determining that any one of secondary tracking target vehicles approaches the vehicle 100 and is closer to the vehicle 100 than the main tracking target vehicle, the processor 717 may determine driving speed based on driving control data received from the approaching secondary tracking target vehicle. In such situations, the driving speed may be determined based on driving control data of the other autonomous driving vehicle closer to the vehicle 100, thereby preventing accident with another autonomous driving vehicle that approaches the vehicle 100.

During reception of the driving control data, the processor 717 may generate a control signal and may provide the generated signal to at least one of the controller 170 or the vehicle driving device 600.

In some implementations, the processor 717 may determine a first transmission location from which another autonomous driving vehicle transmitted a driving control data. Based on the first driving control data, the processor 717 may generate a first control signal configured to track the first autonomous driving vehicle. When the vehicle is located at the first transmission location, the processor 717 may provide the first control signal to at least one of the controller 170 or the vehicle driving device 600.

The processor 717 may select any one of a plurality of other autonomous driving vehicles based on at least one of information on whether paths are matched, information on an autonomous driving mode, information on whether a passenger is present, or information of specification of a power source.

The processor 717 may perform control to receive driving control data from the selected other autonomous driving vehicle.

For example, when a path of a first another autonomous driving vehicle is not matched with a path of the vehicle 100, the processor 717 may not select the first other autonomous driving vehicle as a tracking target vehicle.

For example, when a second another autonomous driving vehicle is in a manual driving mode, the processor 717 may not select the second other autonomous driving vehicle as a tracking target vehicle.

For example, when a passenger is not present in a third another autonomous driving vehicle, the processor 717 may not select the third other autonomous driving vehicle as a tracking target vehicle.

For example, when specification of a power source of a fourth another autonomous driving vehicle is much different from specification of a power source of the vehicle 100, the processor 717 may not select the fourth other autonomous driving vehicle as a tracking target vehicle.

When the vehicle 100 travels based on a control signal, the processor 717 may be maintained in an autonomous driving mode or may be converted into an autonomous driving mode.

When an autonomous driving mode is converted into a manual driving mode according to a user input, etc., the processor 717 may stop providing a control signal.

Upon determining that the vehicle 100 enters a driveway for an autonomous driving vehicle in a manual driving mode, the processor 717 may control the communication device 400 to receive driving control data from another autonomous driving vehicle.

For example, a driver may desire to enter a designated autonomous driving vehicle lane while driving a manual driving vehicle or driving a vehicle in a manual driving mode. A designated autonomous driving vehicle lane may be, for example, a lane in which manual driving is not permitted. In such situations, the processor 717 may control the communication device 400 to receive driving control data from another autonomous driving vehicle. The vehicle 100 may then travel based on the received driving control data and, thus, a manual driving vehicle may also travel on an autonomous driving vehicle driveway.

Under control of the processor 717, the power supply 719 may supply power required for an operation of each component. The power supply 719 may receive power from a battery, etc. in a vehicle.

Figure 9:
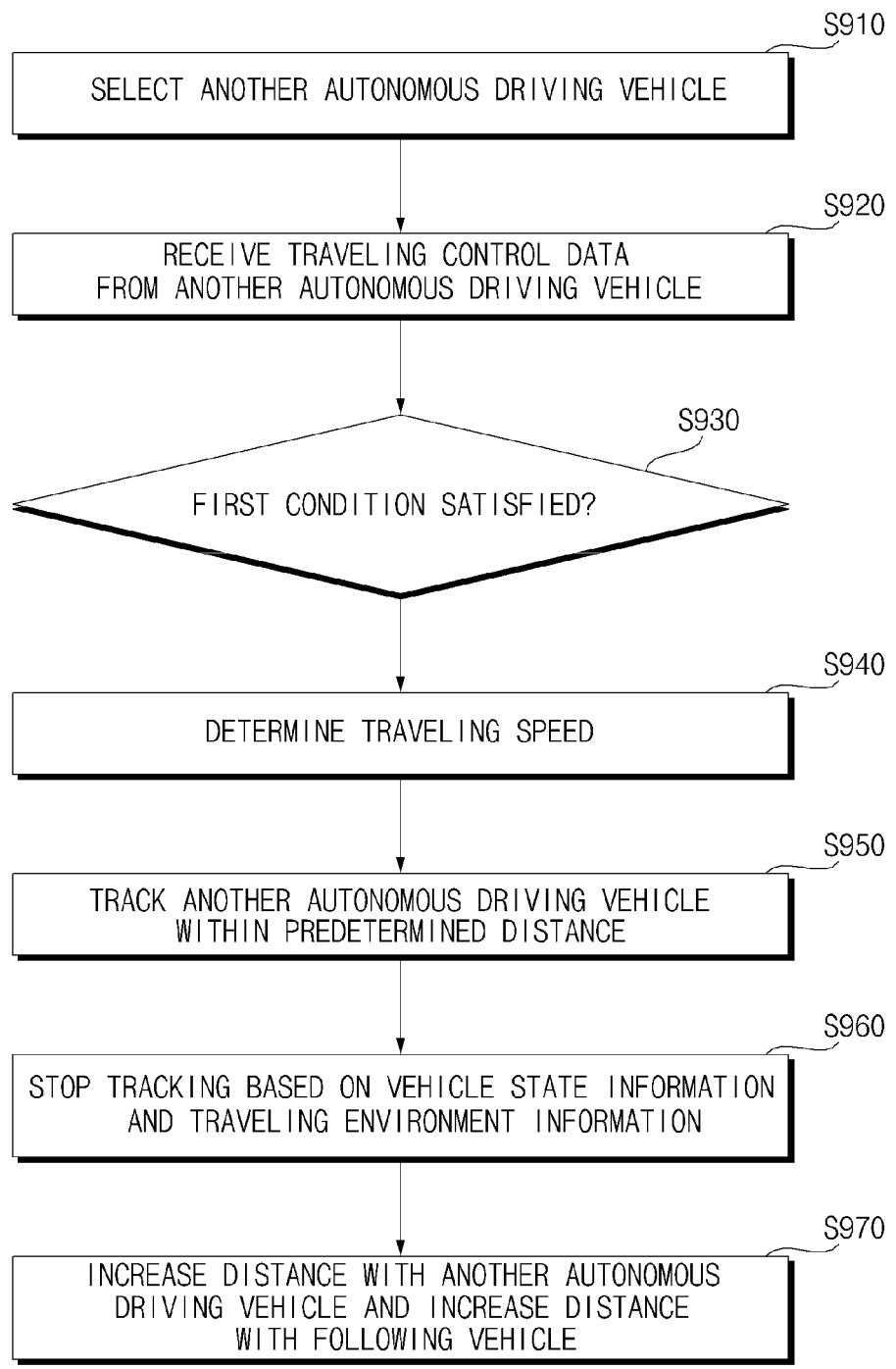
FIG. 9 is a flowchart of an operation of a driving system according to an implementation of the present disclosure.

FIG. 9 is a flowchart of an operation of a driving system according to an implementation of the present disclosure.

Referring to FIG. 9, the processor 717 may select any one of a plurality of other autonomous driving vehicles as a tracking target vehicle (S910).

The processor 717 may receive information on a plurality of other autonomous driving vehicles from the plurality of other autonomous driving vehicles through the communication device 400.

The processor 717 may select any one of a plurality of other autonomous driving vehicles based on at least one of information on whether paths are matched, information on an autonomous driving mode, information on whether a passenger is present, or information of specification of a power source.

The processor 717 may receive driving control data from the selected other autonomous driving vehicle (S920).

The processor 717 may determine whether the driving situation of the vehicle 100 satisfies a first condition (S930).

Upon determining that the driving situation of the vehicle 100 satisfies the first condition, the processor 717 may determine driving speed of the vehicle 100 based on the received driving control data (S940).

The first condition may be defined as a situation condition in which the vehicle 100 is capable of driving to track another autonomous driving vehicle.

The processor 717 may provide a control signal to at least one of the controller 170 or the vehicle driving device 600 to track another autonomous driving vehicle within a predetermined distance (S950).

In operation S950, when the vehicle 100 travels in a manual driving mode, the processor 717 may be converted into an autonomous driving mode.

The processor 717 may stop providing a control signal for tracking based on at least one of vehicle state information or driving environment information (S960).

Upon stopping providing the control signal, the processor 717 may provide a control signal to at least one of the controller 170 or the vehicle driving device 600 to increase a distance value between the vehicle 100 and another autonomous driving vehicle (S970).

Upon stopping providing of the control signal, the processor 717 may transmit a signal to a following vehicle through the communication device 400 to increase a distance value between the vehicle 100 and the following vehicle.

In this case, the following vehicle may receive a signal and may increase a distance with the vehicle 100.

Figure 10:
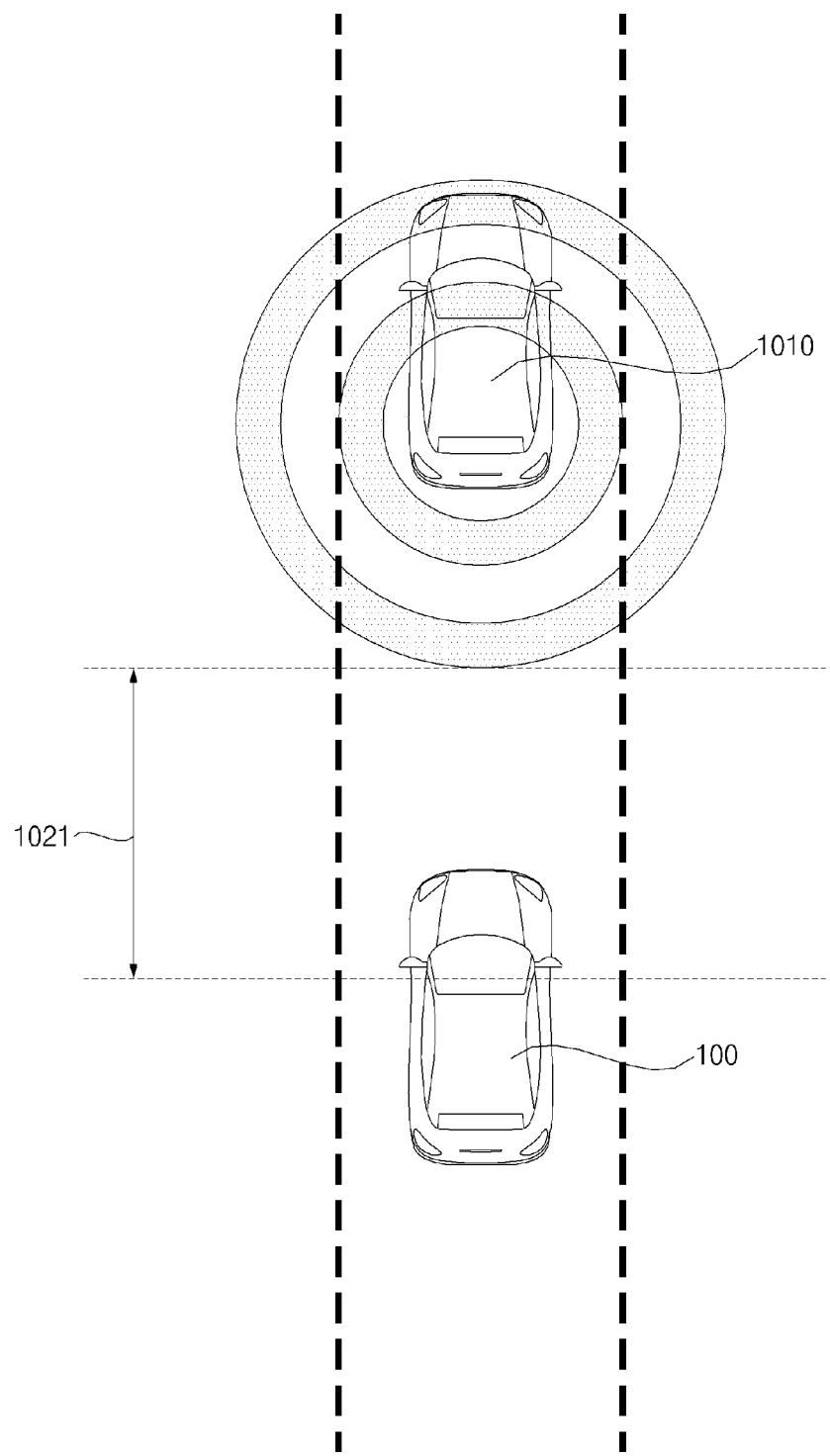
FIG. 10 is a diagram illustrating an example operation scenario of the driving system according to an implementation of the present disclosure.

FIG. 10 illustrates an example operation scenario of the driving system according to an implementation of the present disclosure.

Referring to FIG. 10, the processor 717 may receive information, a signal, or data of each of a plurality of other vehicles from the plurality of other vehicles through the communication device 400.

The processor 717 may select the first other vehicle 1010 among the plurality of other vehicles.

The first other vehicle 1010 may be an autonomous driving vehicle.

The processor 717 may select the first other vehicle 1010 among a plurality of other vehicles based on at least one of information on whether paths are matched, information on an autonomous driving mode, information on whether a passenger is present, or information of specification of a power source.

The processor 717 may receive driving control data of the first other vehicle 1010 from the first other vehicle 1010 through the communication device 400.

The processor 717 may determine whether the driving situation of the vehicle 100 satisfies a first condition based on driving situation information.

The first condition may be defined as a situation condition in which the vehicle 100 is capable of tracking another autonomous driving vehicle.

The first condition may include whether steering control is possible within a reference range, whether speed control is possible within a reference range, whether the first other vehicle 1010 is capable of being sensed by a sensor of the object detection device 300 within a reference range, or whether the vehicle 100 is positioned in a deceleration section.

When the driving situation of the vehicle 100 satisfies the first condition, the processor 717 may control the vehicle 100 to travel based on driving control data received from the first other vehicle 1010.

When the driving situation of the vehicle 100 satisfies the first condition, the processor 717 may provide a control signal.

The processor 717 may determine driving speed of the vehicle 100 based on the received driving control data of the first other vehicle 1010.

The processor 717 may provide a control signal to at least one of the controller 170 or the vehicle driving device 600 to follow the first other vehicle 1010 within a predetermined distance 1021 according to the determined driving speed.

The vehicle 100 may track closer to the first other vehicle 1010 than adaptive cruise control (ACC) is operated in the first other vehicle 1010.

The vehicle 100 may be controlled based on driving control data of the first other vehicle 1010 and, thus, may travel in a similar pattern to the first other vehicle 1010.

When the vehicle 100 is a manual driving vehicle, the vehicle 100 may travel based on driving control data of the first other vehicle, the vehicle 100 may be operated like an autonomous driving vehicle.

Figure 11:
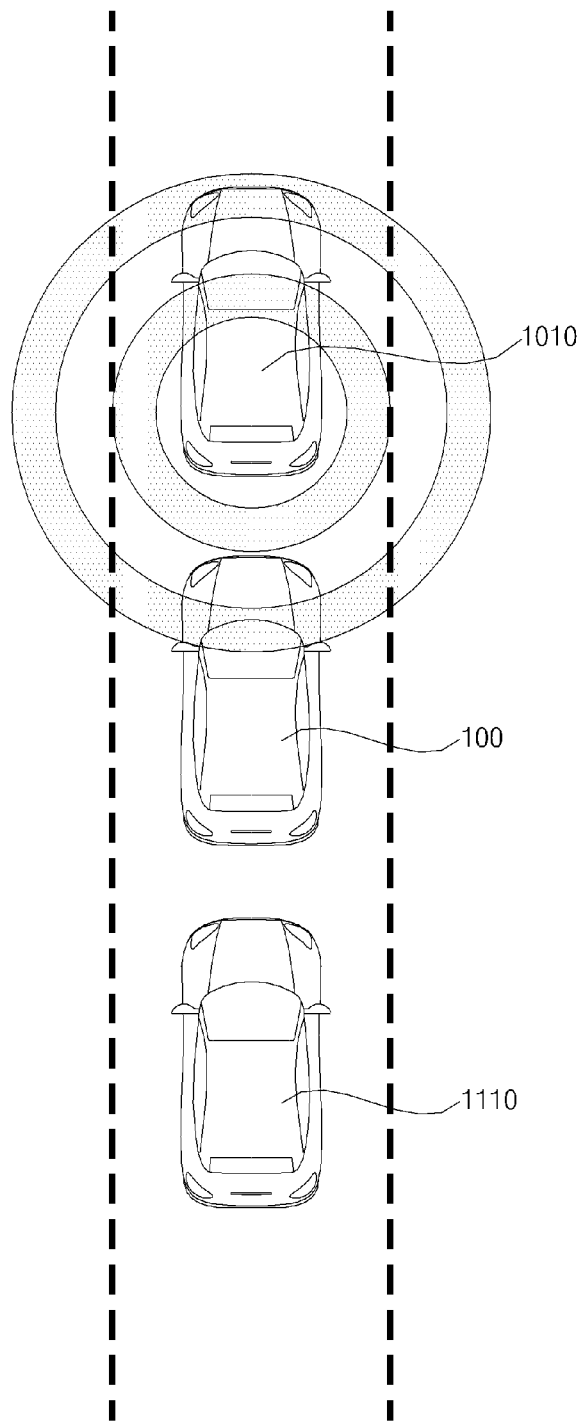
FIG. 11 is a diagram illustrating an example operation scenario of a driving system according to an implementation of the present disclosure.

FIG. 11 illustrates an example operation scenario of a driving system according to an implementation of the present disclosure.

Referring to FIG. 11, the processor 717 may acquire at least one of vehicle state information or driving environment information.

The processor 717 may stop providing a control signal based on vehicle state information or driving environment information. In this case, the processor 717 may stop driving based on driving control data received from the first other vehicle 1010. In this case, the vehicle 100 may terminate tracking of another autonomous driving vehicle.

Upon stopping providing the control signal, the processor 717 may provide the control signal to widen a distance between the vehicle 100 and the first other vehicle 1010.

Upon stopping providing the control signal, the processor 717 may transmit a signal to a following another vehicle 1110 through the communication device 400 to widen a distance between the vehicle 100 and the following another vehicle 1110. In this case, the following another vehicle 1110 may reduce speed based on a signal received from the vehicle 100.

Figure 12:
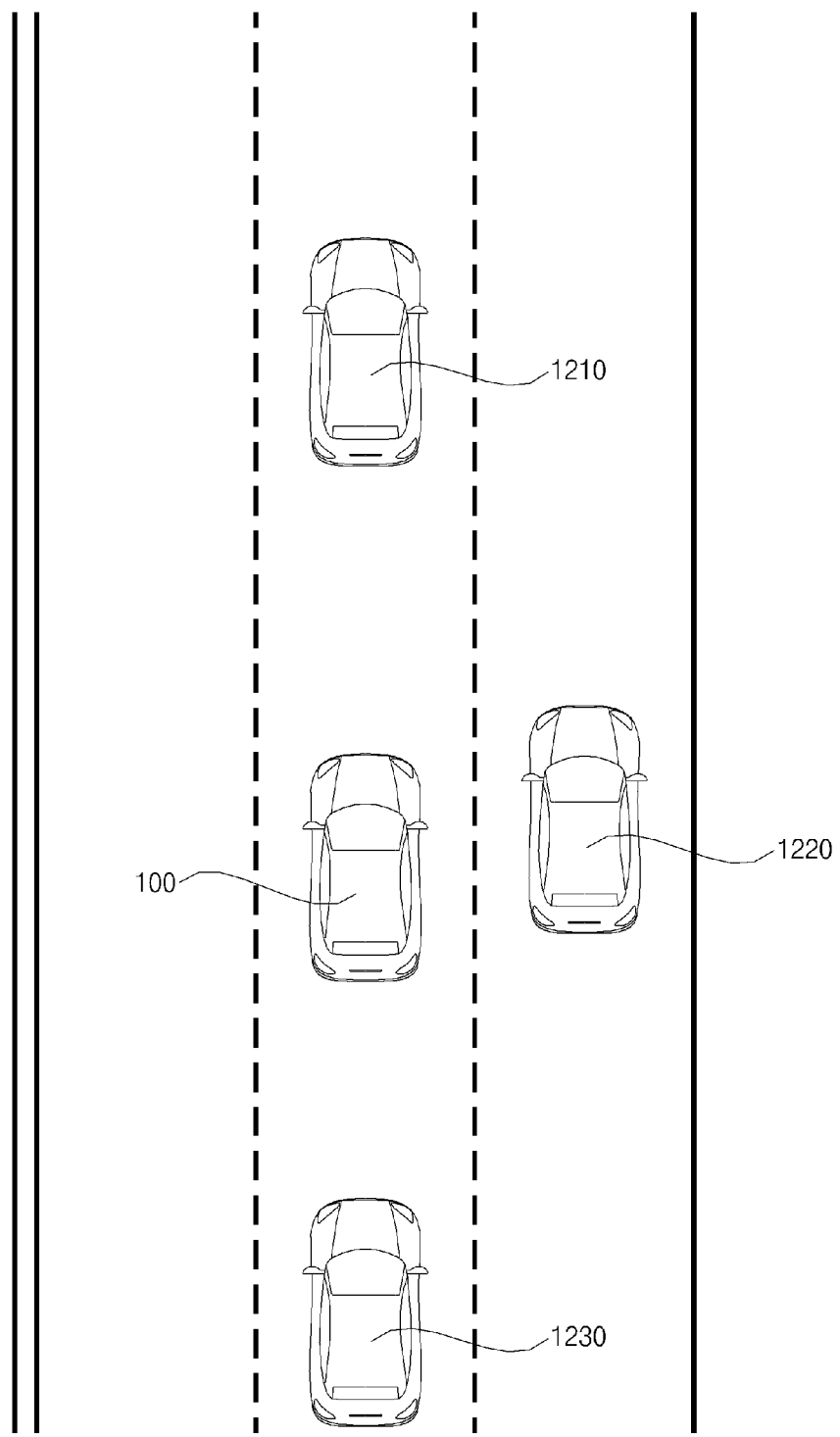
FIG. 12 is a diagram illustrating an example operation scenario of a driving system according to an implementation of the present disclosure.

FIG. 12 illustrates an example operation scenario of a driving system according to an implementation of the present disclosure.

Referring to FIG. 12, a plurality of other vehicles 1210, 1220, and 1230 may travel around the vehicle 100.

The plurality of other vehicles 1210, 1220, and 1230 may each be an autonomous driving vehicle.

A first another vehicle 1210 may precede the vehicle 100.

A second another vehicle 1220 may travel in a lane next to a driving lane of the vehicle 100.

A third another vehicle 1230 may follow the vehicle 100.

The vehicle 100 may set any one of the plurality of other vehicles 1210, 1220, and 1230 as a main tracking target vehicle.

The vehicle 100 may set one or more vehicles except for the vehicle set as the main tracking target vehicle among the plurality of other vehicles 1210, 1220, and 1230, as a secondary tracking target vehicle.

The processor 717 may receive driving control data of a main tracking target vehicle from another vehicle set as a main tracking target vehicle through the communication device 400.

The processor 717 may receive driving control data of a secondary tracking target vehicle from another vehicle set as a secondary tracking target vehicle through the communication device 400, based on a driving situation.

The processor 717 may set the first other vehicle 1210 as a main tracking target vehicle. The processor 717 may set the second other vehicle 1220 or the third other vehicle 1230 as a secondary tracking target vehicle.

The processor 717 may receive driving control data of the first other vehicle 1210 from the first other vehicle 1210. The processor 717 may control the vehicle 100 to travel based on driving control data of the first other vehicle 1210.

When determining a distance value between the first other vehicle 1210 and the vehicle 100 is equal to or greater than a reference value, the processor 717 may receive driving control data from the second other vehicle 1220 or the third other vehicle 1230. The processor 717 may control the vehicle 100 to travel based on driving control data of the second other vehicle 1220 or driving control data of the third other vehicle 1230.

The processor 717 may set the second other vehicle 1220 or the third other vehicle 1230 as a main tracking target vehicle. The processor 717 may set the first other vehicle 1210 as a secondary tracking target vehicle.

The processor 717 may receive driving control data from the second other vehicle 1220 or the third other vehicle 1230. The processor 717 may control to the vehicle 100 to travel based on driving control data of the second other vehicle 1220 or driving control data of the third other vehicle 1230.

Acquiring event occurrence information ahead of the vehicle 100, the processor 717 may receive driving control data from the first other vehicle 1210. The processor 717 may control the vehicle 100 to travel based on driving control data of the first other vehicle 1210.

The processor 717 may set the third other vehicle 1230 as a main tracking target vehicle. The processor 717 may set the first other vehicle 1210 as a secondary tracking target vehicle.

The processor 717 may receive driving control data of the third other vehicle 1230 from the third other vehicle 1230. The processor 717 may control the vehicle 100 to travel based on driving control data of the third other vehicle 1230.

Upon receiving deceleration state information of the third other vehicle 1230, the processor 717 may receive driving control data from the first other vehicle 1210. The processor 717 may control the vehicle 100 to travel based on driving control data of the first other vehicle 1210.

Figure 13:
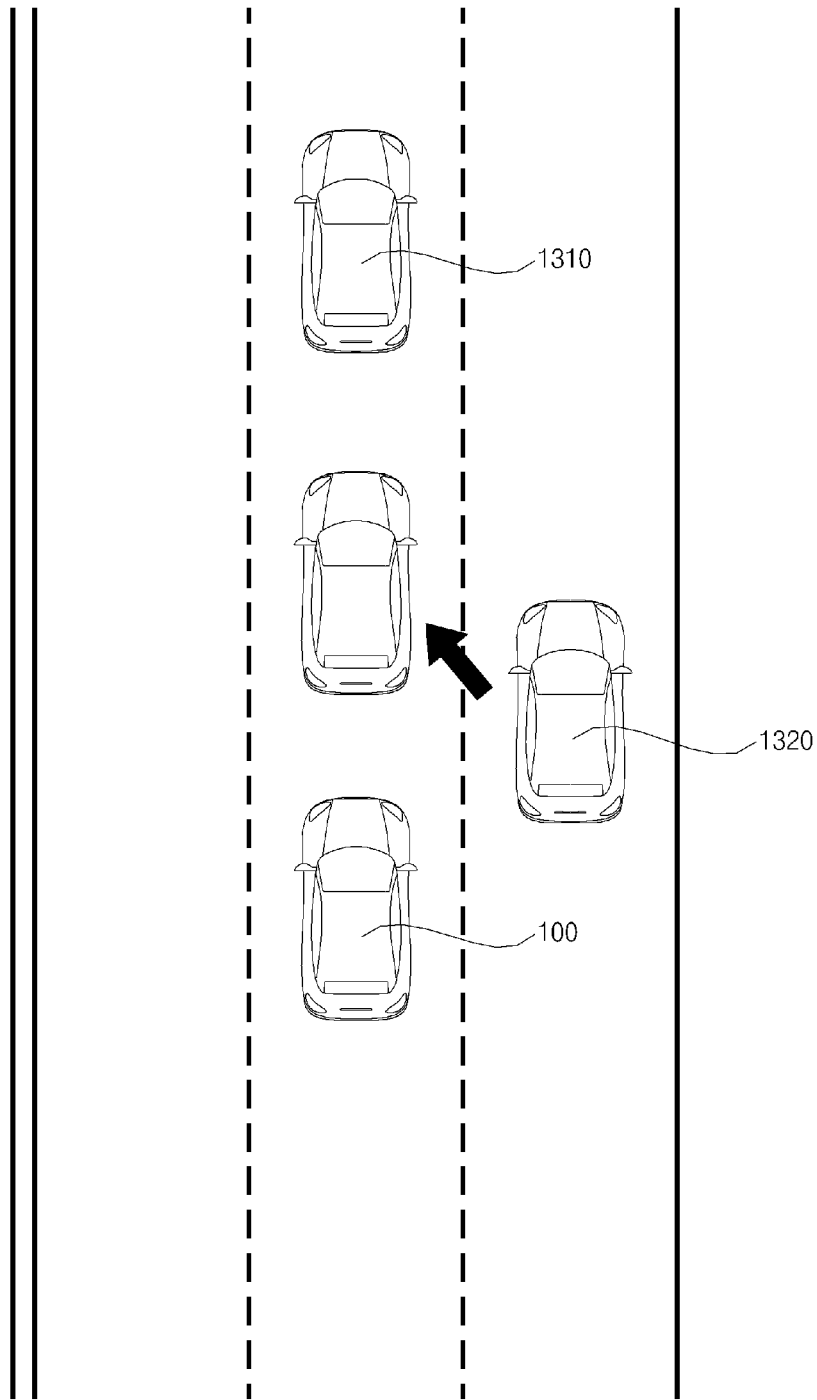
FIG. 13 is a diagram illustrating an example operation scenario of a driving system according to an implementation of the present disclosure.

FIG. 13 illustrates an example operation scenario of a driving system according to an implementation of the present disclosure.

Referring to FIG. 13, the vehicle 100 may set a first another vehicle 1310 as a main tracking target vehicle. The vehicle 100 may set a second another vehicle 1320 as a secondary tracking target vehicle.

The first other vehicle 1310 and the second other vehicle 1320 may be an autonomous driving vehicle.

The vehicle 100 may be grouped with the first other vehicle 1310 and the second other vehicle 1320 and may travel.

In the group, upon determining that the second other vehicle 1320 approaches closer to the vehicle 100 than the first other vehicle 1310 while the first other vehicle 131 approaches the vehicle 100, the processor 717 may control the vehicle 100 to travel based on driving control data received from the second other vehicle 1320.

Figure 14:
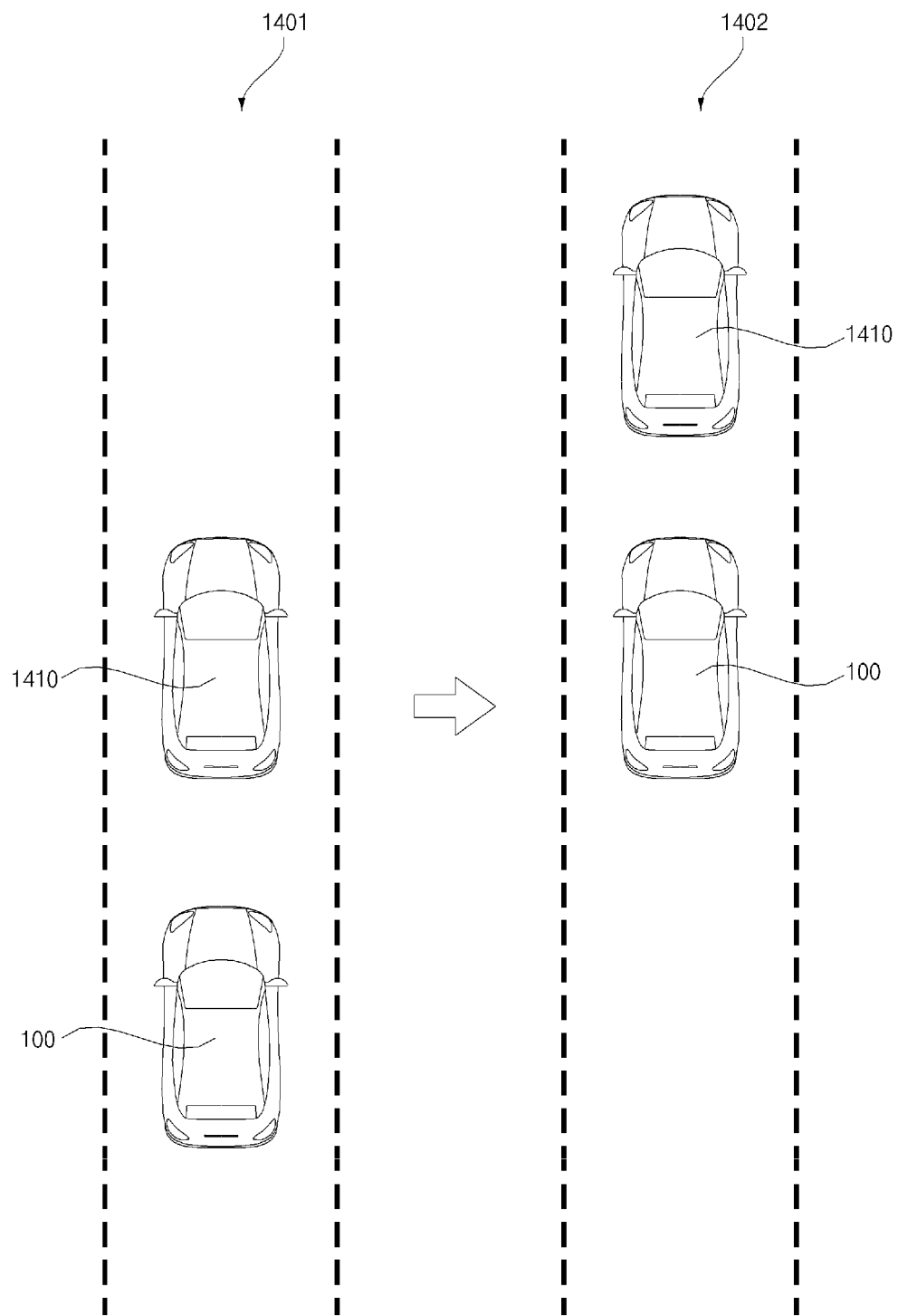
FIG. 14 is a diagram illustrating an example operation scenario of a driving system according to an implementation of the present disclosure.

FIG. 14 illustrates an example operation scenario of a driving system according to an implementation of the present disclosure.

Referring to FIG. 14, the processor 717 may receive driving control data from another autonomous driving vehicle 1410.

Upon receiving driving control data from the other autonomous driving vehicle 1410, the processor 717 may determine driving speed and generate and provide a control signal (1401).

In some implementations, the processor 717 may receive driving control data including location information from the other autonomous driving vehicle 1410.

When the vehicle 100 is positioned in a point where the other autonomous driving vehicle 1410 is positioned at a time point of transmitting driving control data, the processor 717 may generate and provide a control signal (1401).

Figure 15:
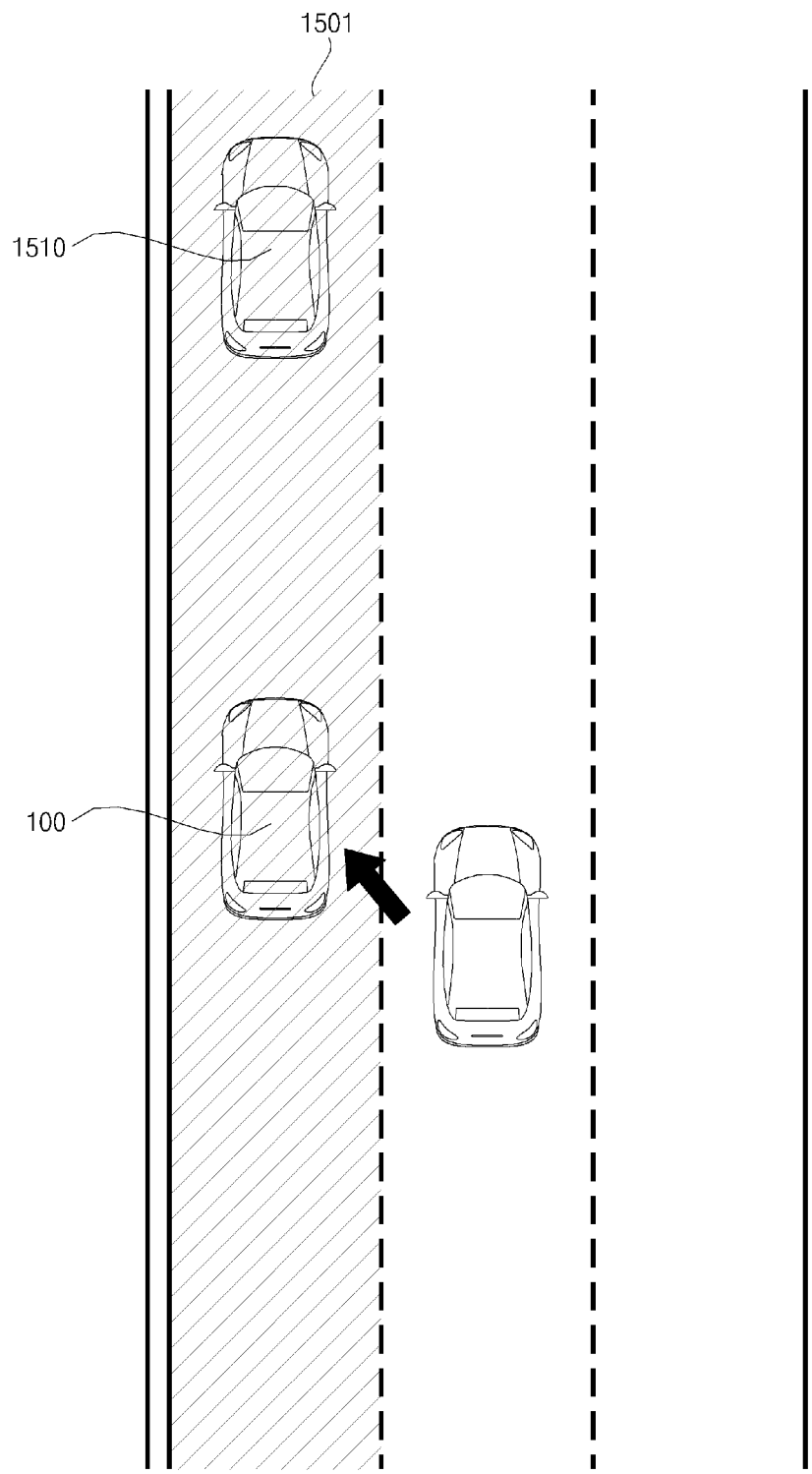
FIG. 15 is a diagram illustrating an example operation scenario of a driving system according to an implementation of the present disclosure.

FIG. 15 illustrates an example operation scenario of a driving system according to an implementation of the present disclosure.

Referring to FIG. 15, a road may include an autonomous driving vehicle driveway 1501 designated for use by autonomous driving vehicles or vehicles otherwise driven in an autonomous manner.

The vehicle 100 may be a manual driving vehicle or may travel in a manual driving mode. Upon determining that the vehicle 100 enters the autonomous driving vehicle driveway 1501 in a manual driving mode, the processor 717 may control the communication device 400 to receive driving control data from another autonomous driving vehicle 1510.

When the vehicle 100 in a manual driving mode enters the autonomous driving vehicle driveway 1501, the vehicle 100 may travel based on driving control data of the other autonomous driving vehicle 1510. In this case, the vehicle 100 may also travel according to a traffic flow of other vehicles that travel on the autonomous driving vehicle driveway 1501.

Figure 16:
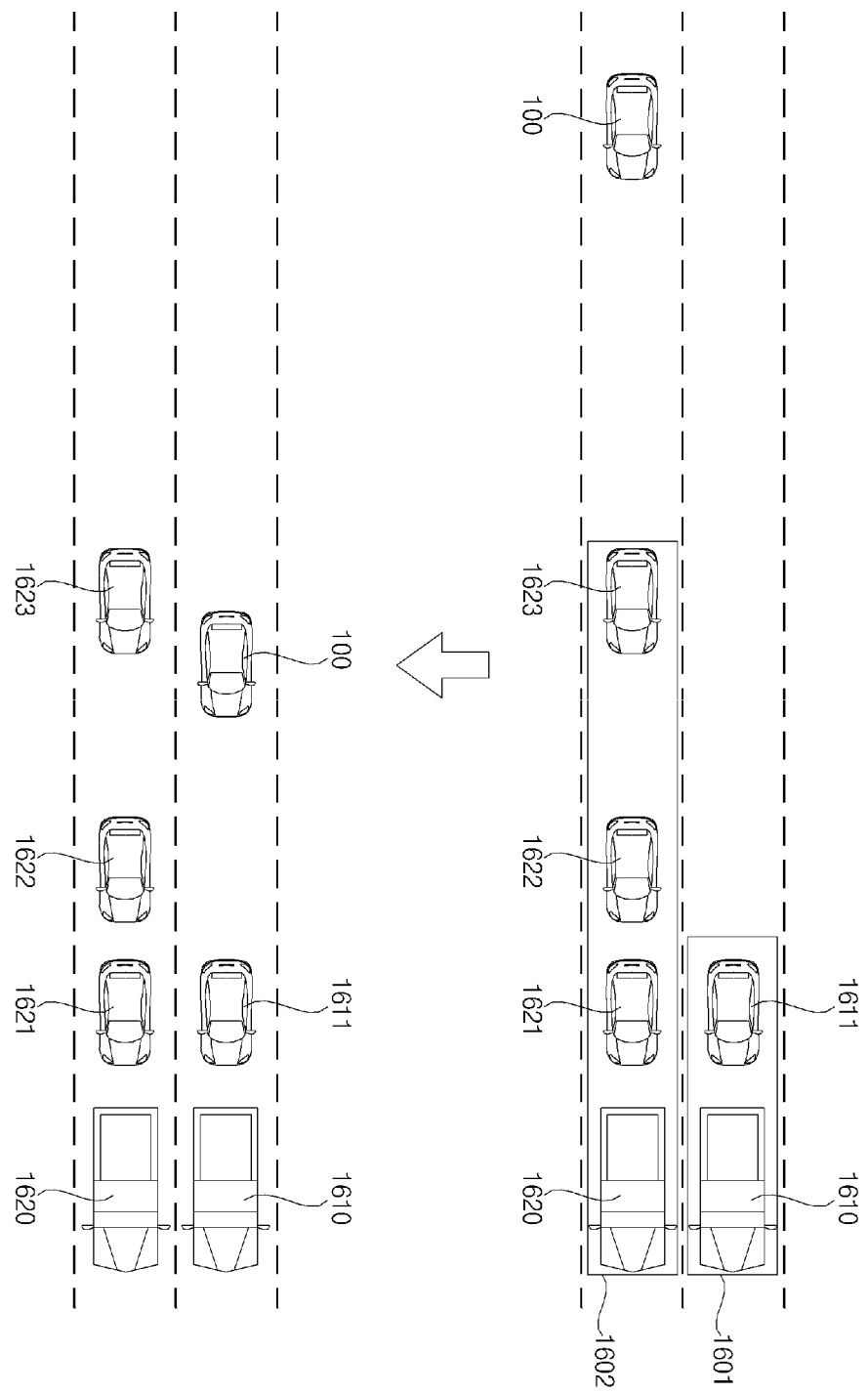
FIG. 16 is a diagram illustrating an example operation scenario of a driving system according to an implementation of the present disclosure.

FIG. 16 illustrates an example operation scenario of a driving system according to an implementation of the present disclosure.

FIG. 16 shows an example in which the vehicle 100 joins a travel group line.

The vehicle 100 may join any one of a plurality of group driving line.

Although FIG. 16 shows an example in which the plurality of group driving lines are a first group driving line 1601 and a second group driving line 1602, the number of the plurality of group driving lines may be three or more.

The vehicle 100 may receive data about a group driving lane of at least one vehicle belonging to the plurality of group driving lines.

The processor 717 may receive data of a group driving line from at least one vehicle belonging to the plurality of group driving lines through the communication device 400.

For example, the processor 717 may receive data of a group driving line from at least one of a first leading vehicle 1610 that leads the first group driving line 1601 and a first tracking target vehicle 1611 belonging to the first group driving line 1601.

For example, the processor 717 may receive data of a group driving line from at least one of a second leading vehicle 1620 leading a second group driving line 1602, or a first tracking target vehicle 1621, a second tracking target vehicle 1622, and a third tracking target vehicle 1623 belonging to the second group driving line 1602.

The processor 717 may receive data of a group driving line from the leading vehicles 1610 and 1620 or the tracking target vehicles 1611 and 1623 at the very last of the group driving line.

The leading vehicles 1610 and 1620 may be an autonomous driving vehicle.

The tracking target vehicle 1611 that follows the leading vehicles 1610 and 1620 may an autonomous driving vehicle or a manual driving vehicle that is capable of tracking the leading vehicles 1610 and 1620 via V2X communication.

The data of the group driving line may be exemplified as driving control data.

The data of the group driving line may include at least one of identification (ID) data of a group driving line, path data of the group driving line, number data of vehicles included in the group driving line, or length data of the group driving line.

The data of the group driving line may further include the number data of vehicles that are allowed in the group driving line and allowable length data of the group driving line.

The vehicle 100 may select and join any one of the plurality of group driving lines based on the data of the group driving line.

The processor 717 may select any one of the plurality of group driving lines based on the data of the group driving line and may control the vehicle 100 to join the selected line.

For example, the processor 717 may compare the number data of vehicles allowed in the group driving line and the number data of vehicles included in the group driving line to determine whether the vehicle joins a corresponding group driving line. When the number of vehicles included in the group driving line is smaller than the number of vehicles allowed in the group driving line, the processor 717 may provide a control signal to allow the vehicle 100 to join a corresponding group line.

For example, the processor 717 may compare allowable length data of the group driving line and length data of the group driving line to determine whether a vehicle joins a corresponding group driving line. When a length of the group driving line is smaller than an allowable length of the group driving line, the processor 717 may provide a control signal to allow the vehicle 100 to join a corresponding group line.

For example, the processor 717 may provide a control signal to allow the vehicle 100 to join a group driving line with a smallest number of vehicles included in the group driving line among the plurality of group driving lines.

For example, the processor 717 may provide a control signal to allow the vehicle 100 to join a group driving line with a smallest length of a group driving line among the plurality of group driving lines.

The present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An electronic device that is provided in a vehicle and that is configured to provide at least one adaptive cruise control (ACC) signal for operating the vehicle in adaptive cruise control based on sensing data from at least one sensor, the device comprising:
   a power supply unit configured to receive power from a power source in the vehicle;
   an interface unit configured to exchange signals with a second electronic device of the vehicle; and
   at least one processor configured to:
      operate by using the power;
      electrically connect to a communication device and receive therethrough traveling control data from a preceding vehicle that is ahead of the vehicle;
      electrically connect to an objection detection device and receive therethrough sensing data regarding the preceding vehicle; and
      provide, through the interface unit and based on the communication device communicating with the preceding vehicle, a control signal corresponding to the traveling control data that causes a vehicle drive control device to control the vehicle, wherein the at least one processor is further configured to:
      provide a first control signal corresponding to the traveling control data to control the vehicle to follow the preceding vehicle within a first predetermined distance, and
      provide a second control signal corresponding to the sensing data to control the vehicle to follow the preceding vehicle within a second predetermined distance, wherein the first predetermined distance is smaller than the second predetermined distance.

2. The electronic device according to claim 1, wherein the vehicle drive control device comprises at least one of a brake driver, a power source driver, a transmission driver, a steering driver, or a suspension driver, and
   the at least one processor is configured to:
      generate the control signal based on receiving the traveling control data; and
      provide the control signal corresponding to the traveling control data to at least one of the brake driver, the power source driver, the transmission driver, the steering driver, or the suspension driver of the vehicle to control the vehicle to travel in a pattern that corresponds to the preceding vehicle.

3. The electronic device according to claim 1, wherein the vehicle drive control device comprises at least one of a brake driver, a power source driver, a transmission driver, a steering driver, or a suspension driver, and
   the at least one processor is configured to provide the first control signal corresponding to the traveling control data to at least one of the brake driver, the power source driver, the transmission driver, the steering driver, or the suspension driver of the vehicle to control the vehicle to follow the preceding vehicle within the first predetermined distance.

4. The electronic device according to claim 3,
   wherein the at least one processor is configured to provide the second control signal corresponding to the sensing data to at least one of the brake driver, the power source driver, the transmission driver, the steering driver, or the suspension driver of the vehicle to control the vehicle to follow the preceding vehicle within the second predetermined distance.

5. The electronic device according to claim 1, wherein receiving the traveling control data from the preceding vehicle is performed in a state in which the preceding vehicle is in an autonomous driving mode.

6. The electronic device according to claim 1, wherein the traveling control data comprises at least one of (i) first sensing data regarding a control operation performed by a second vehicle drive control device of the preceding vehicle, or (ii) second sensing data regarding an environment of the preceding vehicle that is detected by at least one sensor of the preceding vehicle.

7. The electronic device according to claim 6, wherein the first sensing data relates to at least one of an acceleration operation, a deceleration operation, or a braking operation of the preceding vehicle.

8. The electronic device according to claim 1, wherein the at least one processor is configured to:
   based on a reception sensitivity of the communication device not satisfying a threshold value, (i) stop providing the control signal; and (ii) provide the at least one ACC signal for performing adaptive cruise control of the vehicle based on the sensing data from at least one sensor.

9. The electronic device according to claim 1, wherein the at least one processor is configured to:
   in state in which the vehicle is traveling in a first traveling environment, (i) stop providing the at least one ACC signal for adaptive cruise control; and (ii) provide the control signal corresponding to the traveling control data.

10. The electronic device according to claim 1, wherein the at least one processor is configured to:
    receive first map data through the interface unit, the first map data comprising data regarding a curvature or a lane of the road on which the vehicle is travelling; and generate, based on the first map data, a third control signal corresponding to the traveling control data.

11. The electronic device according to claim 10, wherein the at least one processor is configured to:
   in state in which the vehicle is traveling on a curved section of a road, (i) provide the at least one ACC signal for adaptive cruise control based on the sensing data; and (ii) control the vehicle to adjust a distance between the vehicle and the preceding vehicle according to a curvature of the curved section of the road.

12. The electronic device according to claim 10, wherein the at least one processor is configured to select, as the preceding vehicle, a second vehicle that is in front of the vehicle and that is in a driving lane in which the vehicle is travelling.

13. The electronic device according to claim 10, wherein the at least one processor is configured to:
   receive second map data through the interface unit, the second map data lacking the data that is in the first map data regarding the lane of the road on which the vehicle is travelling; and
   generate, based on the second map data, a fourth control signal corresponding to the traveling control data,
   wherein the fourth control signal is configured to cause the vehicle to travel at a second speed that is lower than a first speed at which the vehicle travels based on being controlled by the third control signal.

14. A vehicle comprising:
   a power supply unit configured to receive power from a power source in the vehicle;
   a vehicle drive control device configured to control driving of the vehicle;
   a communication device configured to perform communication with at least one device outside the vehicle;
   an objection device configured to receive sensing data regarding a preceding vehicle that is ahead of the vehicle;
   at least one sensor configured to provide data regarding an environment of the vehicle; and
   at least one processor configured to:
      operate by using the power supplied from the power supply unit;
      electrically connect to the communication device and receive therethrough traveling control data from the preceding vehicle; and
      provide, based on receiving the traveling control data from the preceding vehicle, a control signal corresponding to the traveling control data that causes the vehicle drive control device to control a driving operation of the vehicle,
   wherein the at least one processor is further configured to:
      provide a first control signal corresponding to the traveling control data to control the vehicle to follow the preceding vehicle within a first predetermined distance, and
      provide a second control signal corresponding to the sensing data to control the vehicle to follow the preceding vehicle within a second predetermined distance, wherein the first predetermined distance is smaller than the second predetermined distance.

* * * * *